US010152707B2

(12) United States Patent
Rogers

(10) Patent No.: US 10,152,707 B2
(45) Date of Patent: Dec. 11, 2018

(54) TERMINAL DEVICE, SYSTEM, AND COMPUTER READABLE MEDIUM

(71) Applicant: LINE Corporation, Tokyo (JP)

(72) Inventor: Christopher Rogers, Tokyo (JP)

(73) Assignee: Line Corporation, Tokyo (JP)

( * ) Notice: Subject to any disclaimer, the term of this patent is extended or adjusted under 35 U.S.C. 154(b) by 629 days.

(21) Appl. No.: 14/832,251

(22) Filed: Aug. 21, 2015

(65) Prior Publication Data
US 2016/0314453 A1 Oct. 27, 2016

(30) Foreign Application Priority Data

Apr. 24, 2015 (JP) ................................. 2015-089874

(51) Int. Cl.
| | |
|---|---|
| *G06Q 20/40* | (2012.01) |
| *G06Q 20/20* | (2012.01) |
| *G06Q 20/32* | (2012.01) |
| *G06Q 20/38* | (2012.01) |
| *G06F 1/16* | (2006.01) |
| *H04W 4/80* | (2018.01) |

(52) U.S. Cl.
CPC ......... *G06Q 20/327* (2013.01); *G06Q 20/322* (2013.01); *G06Q 20/3272* (2013.01); *G06Q 20/3278* (2013.01); *H04W 4/80* (2018.02)

(58) Field of Classification Search
CPC ........ G06Q 20/20; G06Q 20/02; G06Q 99/00; G06Q 20/32; G06Q 20/327; G06Q 20/3278; G06Q 20/40; G06Q 20/38; G06F 17/60; G06F 15/16

USPC .......................................................... 705/44
See application file for complete search history.

(56) References Cited

U.S. PATENT DOCUMENTS

| | | | |
|---|---|---|---|
| 7,194,438 B2 * | 3/2007 | Sovio .................... | G06Q 20/20 705/50 |
| 2002/0103765 A1 * | 8/2002 | Ohmori .................. | G06Q 20/02 705/67 |

(Continued)

FOREIGN PATENT DOCUMENTS

| | | |
|---|---|---|
| JP | 2002-149600 A | 5/2002 |
| JP | 2013-140453 A | 7/2013 |

*Primary Examiner* — Clifford B Madamba
(74) *Attorney, Agent, or Firm* — Harness, Dickey & Pierce, P.L.C.

(57) ABSTRACT

A terminal device includes a first communication unit that performs communication via a first short-range wireless communication method, and a second communication unit that performs communication via a second short-range wireless communication method different from the first short-range wireless communication method. The terminal device further includes an obtaining unit that obtains payment information including information on a monetary amount for goods or a service by using the first communication unit, a confirmation unit that accepts input of information indicating payment approval for the obtained payment information, and a transmission unit that, in response to acceptance of input of the information indicating the payment approval, transmits the obtained payment information to an information terminal by using the second communication unit. The information terminal communicates with a payment server via a network. The payment server performs a payment process related to the obtained payment information.

19 Claims, 18 Drawing Sheets

(56) References Cited

U.S. PATENT DOCUMENTS

2006/0149846 A1* 7/2006 Schuba .................. G06F 21/36
709/229
2014/0379566 A1 12/2014 Akashika

* cited by examiner

| STORE ID: S001 | | | | |
|---|---|---|---|---|
| TRANSACTION ID | TRANSACTION DATE | PAYMENT AMOUNT | USER ID | ... |
| TR001 | 12/01/2014 | 9,000 | U001 | ... |
| TR002 | 12/03/2014 | 10,500 | U001 | ... |
| TR003 | 12/10/2014 | 3,000 | U002 | ... |
| ... | ... | ... | ... | ... |

STORE ID: S002
STORE ID: S003

TRANSACTION INFORMATION (rows TR001–TR003...)

TERMINAL DEVICE, SYSTEM, AND COMPUTER READABLE MEDIUM

CROSS-REFERENCE TO RELATED APPLICATION

This application claims the benefit of Japanese Patent Application No. 2015-089874, filed on Apr. 24, 2015, in the Japanese Patent Office, the disclosure of which is incorporated herein in its entirety by reference.

BACKGROUND

1. Field

Example embodiments relate to a terminal device, a system, and/or a computer readable medium.

2. Description of the Related Art

A device may allow an offline settlement device (e.g., a point-of-sale (POS) terminal) to conduct an online payment by transmitting payment information from the settlement device to a payment server using a communication function of an information terminal (e.g., a mobile terminal) of a user.

A system may allow a user to utilize services via the mobile terminal in conjunction with a wearable terminal (e.g., a wrist watch) that generates a one-time password in response to a request from the mobile terminal and transmits the one-time password to the mobile terminal.

However, these conventional systems may require a user to perform an operation, for example, moving the information terminal close to the settlement device in order to obtain settlement information from the settlement device. For example, to pay fees for goods, services, and the like by a user the information terminal operating in conjunction with the wearable terminal. It may be more convenient for the user if the user can pay by operating the wearable terminal without operating the information terminal.

In addition, the payment terminal and the information terminal may support different short-range wireless communication protocols when the wearable terminal receives payment information from the payment terminal via short-range wireless communication in order for the wearable terminal to implement a payment operation. In order for a wearable terminal to implement a payment operation, therefore, it may be desirable that the wearable terminal can perform payment-related processes using a plurality of short-range wireless communication methods.

SUMMARY

Some example embodiments relate to a terminal device (such as a wearable terminal) capable of performing payment-related processes using a plurality of short-range wireless communication methods in a payment system in which payments are made using the terminal device in conjunction with an information terminal.

In some example embodiments, the terminal device includes a first communication unit, a second communication unit, an obtaining unit, a confirmation unit, and a transmission unit. The first communication unit performs communication via a first short-range wireless communication method. The second communication unit performs communication via a second short-range wireless communication method different from the first short-range wireless communication method. The obtaining unit obtains payment information including information on a monetary amount for goods or a service by using the first communication unit. The confirmation unit accepts input of information indicating payment approval for the obtained payment information. In response to acceptance of input of the information indicating the payment approval, the transmission unit transmits the obtained payment information to an information terminal by using the second communication unit. The information terminal is configured to communicate with a payment server via a network. The payment server is configured to perform a payment process related to the obtained payment information.

In some example embodiments, the terminal device is capable of performing payment-related processes using a plurality of short-range wireless communication methods in a payment system in which payments are made using the terminal device in conjunction with an information terminal.

Some example embodiments relate to a terminal device.

In some example embodiments, the terminal device includes at least one transceiver configured to collectively communicate via at least a first short-range wireless communication protocol and a second short-range wireless communication protocol; and a memory and a processor, the memory containing computer readable code that, when executed by the processor, configures the processor to, relay, via the at least the one transceiver, information received via the first short-range wireless communication protocol to a server via the second short-rage wireless communication protocol, and process a result received from the server via the second short-range wireless communication protocol.

In some example embodiments, the processor is configured to relay the information by, receiving, via the at least one transceiver, the information from a first terminal via the first short-range wireless communication protocol, and transmitting, the information to a second terminal via the second short-range wireless communication protocol.

In some example embodiments, the processor is configured to instruct the second terminal to transmit the information to the server.

In some example embodiments, the information is payment information received from a point of sales terminal, and the processor is configured to instruct the second terminal to transmit the payment information to the server along with identification information of a user associated with one or more of the terminal device and the second terminal.

In some example embodiments, the at least one transceiver includes a first transceiver configured to communicate with the first terminal via the first short-range wireless communication protocol; and a second transceiver configured to communicate with the second terminal via the second short-range wireless communication protocol.

In some example embodiments, the first short-range wireless communication protocol is a protocol that utilizes a sound wave or ultrasonic wave to transmit data, and the second short-range wireless communication protocol is a protocol that utilizes electromagnetic fields to transmit data.

In some example embodiments, the second short-range wireless communication protocol is an Radio Frequency Identification (RFID) protocol.

In some example embodiments, the second short-range wireless communication protocol is a Bluetooth Low Energy (BLE) protocol.

In some example embodiments, the terminal device is configured to relay the information without requiring a user to access the first terminal.

In some example embodiments, the first terminal is configured to communicate with the server via a cellular network.

In some example embodiments, the terminal device is a wearable device.

BRIEF DESCRIPTION OF THE DRAWINGS

FIG. 8 is a configuration diagram of an example of a store transaction table.

DETAILED DESCRIPTION

Figure 1:
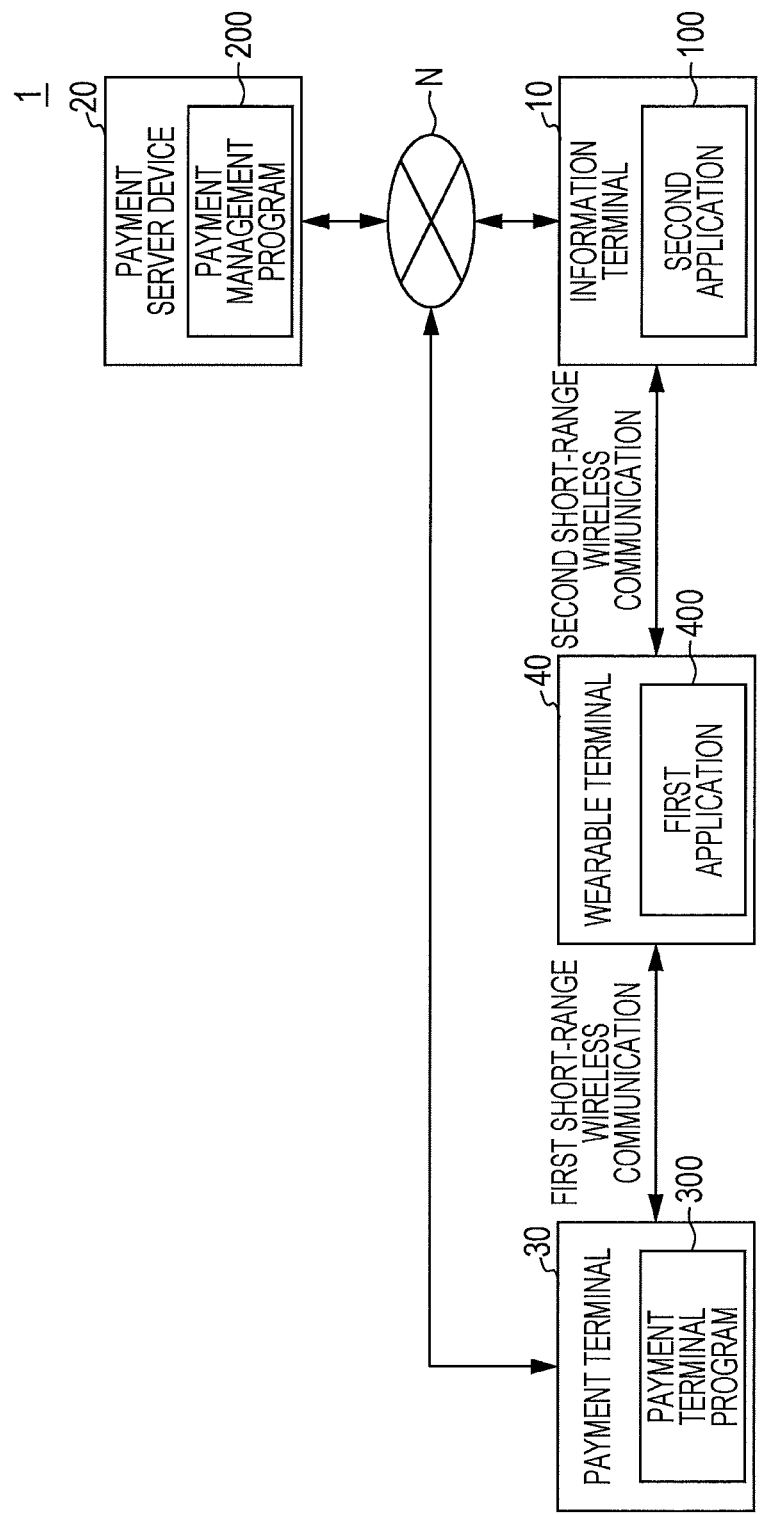
FIG. 1 is a configuration diagram of an example of a payment system according to an example embodiment.

Example embodiments will be described in detail hereinafter with reference to the drawings. The advantages and features of the example embodiments and methods of achieving them will be apparent from the following example embodiments that will be described in more detail with reference to the accompanying drawings. It should be noted, however, that the inventive concepts are not limited to the following example embodiments, and may be implemented in various forms. Accordingly, the example embodiments are provided only to disclose the inventive concepts and let those skilled in the art know the category of the inventive concepts. In the drawings, example embodiments of the inventive concepts are not limited to the specific examples provided herein and are exaggerated for clarity.

The terminology used herein is for the purpose of describing example embodiments only and is not intended to limit example embodiments. As used herein, the singular terms "a," "an" and "the" are intended to include the plural forms as well, unless the context clearly indicates otherwise. As used herein, the term "and/or" includes any and all combinations of one or more of the associated listed items. It will be understood that when an element is referred to as being "connected" or "coupled" to another element, it may be directly connected or coupled to the other element or intervening elements may be present.

Similarly, it will be understood that when an element such as a layer, region or substrate is referred to as being "on" another element, it can be directly on the other element or intervening elements may be present. In contrast, the term "directly" means that there are no intervening elements. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Additionally, example embodiments in the detailed description will be described with sectional views as example views of the inventive concepts. Accordingly, shapes of the example views may be modified according to manufacturing techniques and/or allowable errors. Therefore, example embodiments of the inventive concepts are not limited to the specific shape illustrated in the example views, but may include other shapes that may be created according to manufacturing processes. Areas exemplified in the drawings have general properties, and are used to illustrate specific shapes of elements. Thus, this should not be construed as limited to the scope of the inventive concepts.

It will be also understood that although the terms first, second, third etc. may be used herein to describe various elements, these elements should not be limited by these terms. These terms are only used to distinguish one element from another element. Thus, a first element in some example embodiments could be termed a second element in other example embodiments without departing from the teachings of the example embodiments. Example embodiments explained and illustrated herein include their complementary counterparts. The same reference numerals or the same reference designators denote the same elements throughout the specification.

Moreover, example embodiments are described herein with reference to cross-sectional illustrations and/or plane illustrations that are idealized example illustrations. Accordingly, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of example embodiments.

As appreciated, devices and methods of forming devices according to various example embodiments described herein may be embodied in microelectronic devices such as integrated circuits, wherein a plurality of devices according to various example embodiments described herein are integrated in the same microelectronic device. Accordingly, the cross-sectional view(s) illustrated herein may be replicated in two different directions, which need not be orthogonal, in the microelectronic device. Thus, a plan view of the microelectronic device that embodies devices according to various example embodiments described herein may include a plurality of the devices in an array and/or in a two-dimensional pattern that is based on the functionality of the microelectronic device.

The devices according to various example embodiments described herein may be interspersed among other devices depending on the functionality of the microelectronic device. Moreover, microelectronic devices according to various example embodiments described herein may be replicated in a third direction that may be orthogonal to the two different directions, to provide three-dimensional integrated circuits.

Accordingly, the cross-sectional view(s) illustrated herein provide support for a plurality of devices according to various example embodiments described herein that extend along two different directions in a plan view and/or in three different directions in a perspective view. For example, when a single active region is illustrated in a cross-sectional view of a device/structure, the device/structure may include a plurality of active regions and transistor structures (or memory cell structures, gate structures, etc., as appropriate to the case) thereon, as would be illustrated by a plan view of the device/structure.

Example embodiments disclosed herein may include hardware configured to execute program code including program instructions, software components, software modules, data files, data structures, and/or the like. Examples of program code include both machine code produced by a compiler and higher level program code that is executed using an interpreter. The hardware devices may include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

Alternatively, or in addition to the processors discussed above, the hardware devices may include one or more Central Processing Units (CPUs), digital signal processors (DSPs), application-specific-integrated-circuits (ASICs), SoCs, field programmable gate arrays (FPGAs), or the like. In at least some cases, the one or more CPUs, SoCs, DSPs, ASICs and FPGAs, may generally be referred to as processing circuits and/or microprocessors. The hardware devices may be configured as special purpose processing circuits and/or hardware devices to perform functions illustrated in one or more of the flow charts or sequence diagrams discussed herein.

The hardware devices may also include one or more storage devices. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing the example embodiments described herein. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

It will be apparent to those skilled in the art that various modifications and variations can be made to the example embodiments without departing from the spirit or scope of the inventive concepts described herein. Thus, it is intended that the example embodiments cover the modifications and variations of the example embodiments provided they come within the scope of the appended claims and their equivalents.

First Embodiment

System Configuration

FIG. 1 is a configuration diagram of an example of a payment system 1 according to a first embodiment.

Referring to FIG. 1, the payment system 1 illustrated in FIG. 1 includes an information terminal 10, a payment server device 20, a payment terminal 30, and a wearable terminal 40.

In the payment system 1, the information terminal 10, the payment server device 20, and the payment terminal 30 are connected to one another via a wide-area network N, such as the Internet, so as to be capable of communicating with one another. The information terminal 10 and the wearable terminal 40 are connected to each other via a second short-range wireless communication method such as Bluetooth Low Energy (BLE) so as to be capable of communicating with each other. The payment terminal 30 and the wearable terminal 40 can communicate with each other via a first short-range wireless communication method different from the second short-range wireless communication method. Throughout the drawings, the first short-range wireless communication method is represented as "first short-range wireless communication", and the second short-range wireless communication method is represented as "second short-range wireless communication".

The information terminal 10 is an information processing device such as a smartphone, a tablet terminal, or a notebook personal computer (PC). The information terminal 10 has incorporated (or installed) therein, for example, a second application 100 for processing the billing (or payment) for goods purchased by a user or services provided to the user in conjunction with a first application 400 (described below) in the wearable terminal 40. For example, in response to a payment request made by the payment terminal 30, which has been received from the wearable terminal 40, the information terminal 10 requests the payment server device 20 to perform payment activities, and notifies the wearable terminal 40 of the result of the payment activities.

The payment server device 20 includes one or more information processing devices, for example. The payment server device 20 has incorporated therein a payment management program 200, and performs a payment process in response to a payment request made by the payment terminal 30, which has been received from the information terminal 10.

The payment terminal 30 may be a POS terminal such as a POS register in premises, such as a store, in which, for example, goods are sold or from which services are provided. The payment terminal 30 has incorporated therein a payment terminal program 300, and is capable of requesting the payment server device 20 to perform payment activities through the wearable terminal 40 and the information terminal 10, for example, by communicating with the wearable terminal 40 via the first short-rage wireless communication method.

The payment terminal 30 is not limited to a POS terminal such as a register in a store or the like, and may be a smartphone, a tablet terminal, a notebook PC, or the like in which the payment terminal program 300 is incorporated. Examples of the payment terminal 30 include a variety of electronic devices in which the payment terminal program 300 is incorporated and which is capable of communicating with the wearable terminal 40 using the first short-range wireless communication method.

The wearable terminal 40 may be a user-wearable information device that is worn by the user for use, such as a smartwatch serving as a wristwatch-type information terminal or smart glasses serving as an eyeglass-type information terminal. The wearable terminal 40 has incorporated (or installed) therein, for example, the first application 400 for processing the billing (or payment) for goods purchased by the user or services provided to the user in conjunction with the second application 100 in the information terminal 10.

Upon receipt of a payment request including monetary amount information from the payment terminal 30 via the first short-range wireless communication method, the wearable terminal 40 displays a confirmation screen corresponding to the payment request to prompt the user to confirm the payment. Upon receipt of information indicating approval of the payment by the user, the wearable terminal 40 transmits the payment request to the information terminal 10 via the second short-range wireless communication method different from the first short-range wireless communication method.

The wearable terminal 40 is an example of a terminal device, however, example embodiments are not limited thereto. For example, the terminal device may be an information device or the like that is not worn by a user.

Overview of Process

An overview of a process performed in the payment system 1 according to an embodiment will now be described. In the following description, a user makes a payment for goods and the like purchased in a store using the wearable terminal 40 and the information terminal 10.

Figure 2:
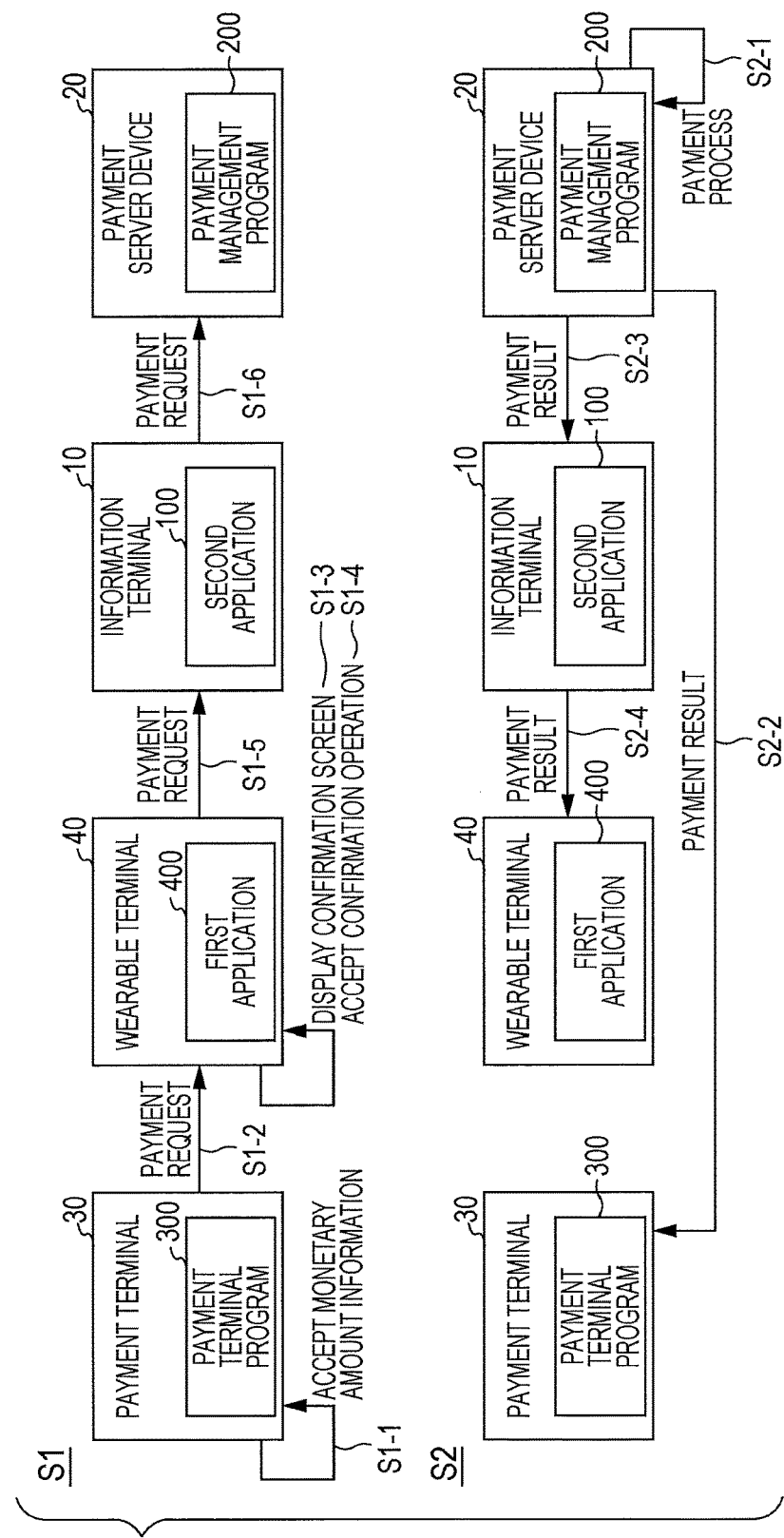
FIG. 2 is a diagram illustrating an overview of a process performed in the payment system according to an example embodiment.

FIG. 2 is a diagram illustrating an overview of a process performed in the payment system 1 according to this embodiment.

Referring to FIG. 2, the process performed by the payment system may be divided into a first stage S1 in which a payment request is sent to the payment server device 20, and a second stage S2 in which the payment server device 20 transmits a payment result.

In operation S1-1, the staff at the store inputs information on a monetary amount (hereinafter referred to as the "monetary amount information") for goods to the payment terminal 30.

In operation S1-2, the payment terminal 30 transmits a payment request (or payment information) including the input monetary amount information to the wearable terminal 40 via a first short-range wireless communication method.

In operation S1-3, upon receipt of the payment information via the first short-range wireless communication method, the wearable terminal 40 displays a confirmation screen for inputting information indicating whether or not to make a payment in accordance with the received payment information, and prompts the user to confirm the payment.

In operation S1-4, the wearable terminal 40 receives an input from the user indicating the confirmation (or approval) of the payment.

In operation S1-5, the wearable terminal 40 transmits the payment information received from the payment terminal 30 to the information terminal 10 via a second short-range wireless communication method different from the first short-range wireless communication method.

In operation S1-6, upon receipt of the payment information from the wearable terminal 40 via the second short-range wireless communication method, the information terminal 10 requests the payment server device 20 to perform payment activities for the received payment information via the network N.

In operation S2-1, upon receipt of the payment information, the payment server device 20 performs a desired (or, alternatively, a predetermined) payment process.

In operations S2-2 and S2-3, the payment server device 20 transmits the result of the payment process (hereinafter referred to as the "payment result") to the information terminal 10 and the payment terminal 30.

In operation S2-4, Upon receipt of the payment result from the payment server device 20, the information terminal 10 notifies the wearable terminal 40 of the received the payment result.

In the payment system 1 according to an example embodiment, as described above, the wearable terminal 40 and the information terminal 10 operate in conjunction with each other to transfer payment information sent from the payment terminal 30 to the payment server device 20. Since payment checks are available on the wearable terminal 40, the user is able to confirm the payment without interacting with the information terminal 10, and, therefore, the information terminal 10 may be left in a bag, jacket, or the like during payment.

In addition, the wearable terminal 40 may transmit payment information to the information terminal 10 using a second short-range wireless communication method different from a first short-range wireless communication method by which the wearable terminal 40 has received the payment information from the payment terminal 30. Accordingly, the wearable terminal 40 can accept payment information from the payment terminal 30 using a short-range wireless communication method appropriate to the situation.

Hardware Configuration

Next, the hardware configuration of the information terminal 10, the payment server device 20, the payment terminal 30, and the wearable terminal 40 in the payment system 1 according to an example embodiment will be described.

Figure 3:
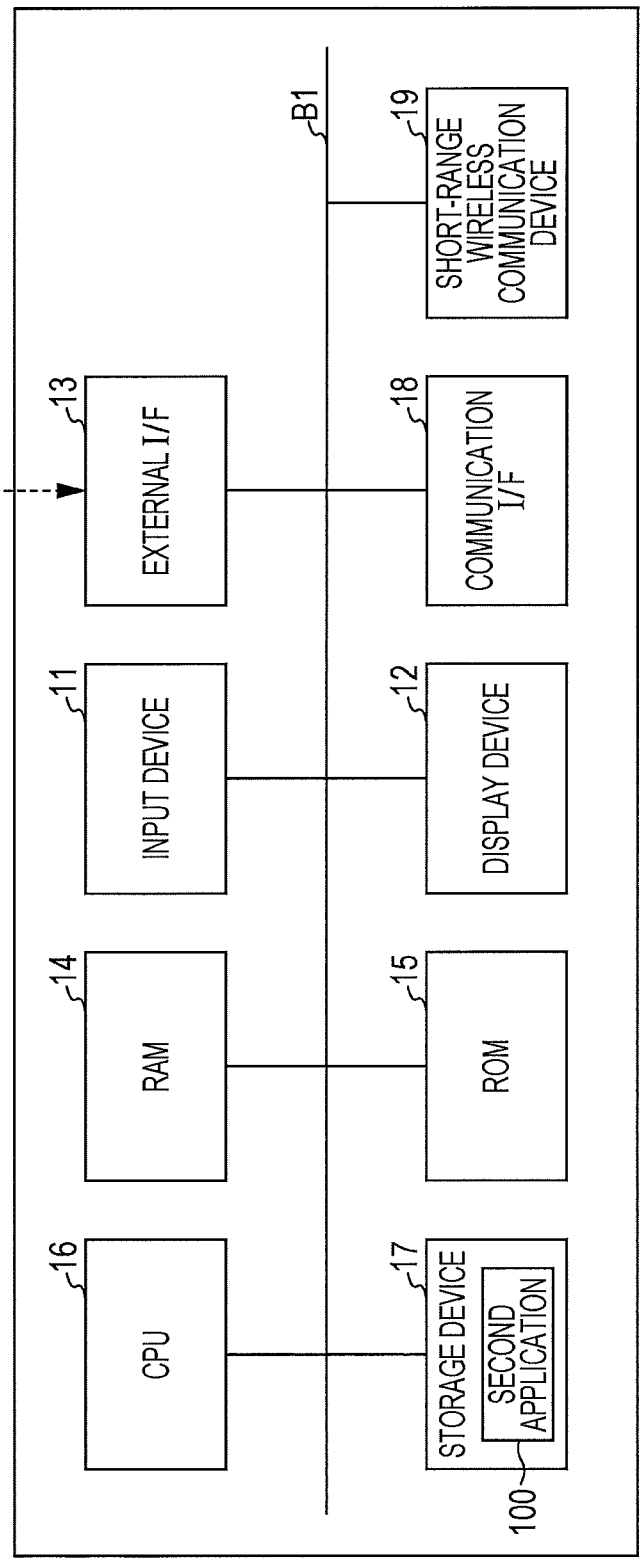
FIG. 3 is a hardware configuration diagram of an example of an information terminal according to an example embodiment.

FIG. 3 is a hardware configuration diagram of an example of the information terminal 10 according to an example embodiment.

Referring to FIG. 3, the information terminal 10 may include, for example, an input device 11, a display device 12, an external interface (I/F) 13, a random access memory (RAM) 14, a read-only memory (ROM) 15, a central processing unit (CPU) 16, a storage device 17, a communication I/F 18, and a short-range wireless communication device 19. The hardware components described above are connected to one another via a bus B1.

The input device 11 is a touch panel, buttons, a keyboard, or the like, and is used by a user to input operation signals. The display device 12 is a display or the like, and displays the result of a process performed by the information terminal 10.

The external I/F 13 is an interface with an external device. Examples of the external device include a recording medium 13a. The information terminal 10 can read and/or write data from and/or to the recording medium 13a via the external I/F 13. Examples of the recording medium 13a include various memory cards.

The RAM 14 is a volatile semiconductor memory that stores a program and data. The ROM 15 is a non-volatile semiconductor memory capable of holding a program and data even if power is turned off. The ROM 15 stores, for example, various types of information on the information terminal 10, such as operating system (OS) settings and network settings, and a program for startup.

The CPU 16 is an arithmetic operation device that reads the program or data onto the RAM 14 from the ROM 15, the storage device 17, or the like and performs a process to control the overall operation of the information terminal 10 and implement the functions of the information terminal 10.

The storage device 17 is a storage unit such as a hard disk drive (HDD), a solid state drive (SSD), or a flash ROM. The storage device 17 stores, for example, an OS that is a piece of basic software for controlling the overall operation of the information terminal 10, and application software (for example, the second application 100) for providing various functions to the OS, when the application software is executed by the CPU 16.

The communication I/F 18 is an interface for connecting the information terminal 10 to the network N. The information terminal 10 can perform data communication with the payment server device 20 via the communication I/F 18.

The short-range wireless communication device 19 is, for example, a BLE chip or the like, and performs short-range wireless communication with the wearable terminal 40 via BLE or the like.

Figure 4:
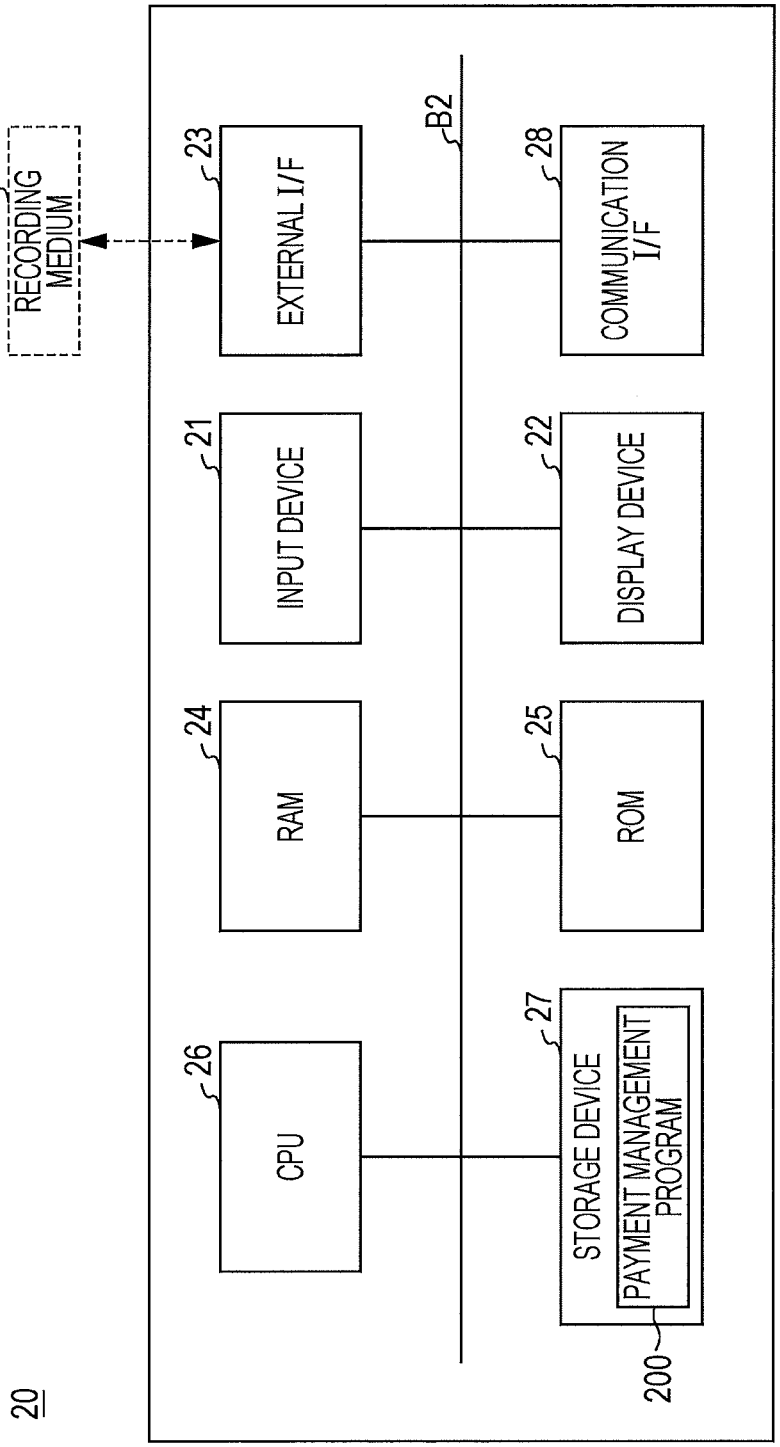
FIG. 4 is a hardware configuration diagram of an example of a payment server device according to an example embodiment.

FIG. 4 is a hardware configuration diagram of an example of the payment server device 20 according to an example embodiment.

Referring to FIG. 4, the payment server device 20 may include, for example, an input device 21, a display device 22, an external I/F 23, a RAM 24, a ROM 25, a CPU 26, a storage device 27, and a communication I/F 28. The hardware components described above are connected to one another via a bus B2.

The input device 21 includes a keyboard, a mouse, and so forth, and is used by a user to input operation signals. The display device 22 is a display or the like, and displays the result of a process performed by the payment server device 20. The input device 21 and the display device 22 may be connected for use when necessary.

The external I/F 23 is an interface with an external device. Examples of the external device include a recording medium 23a. The payment server device 20 can read and/or write data from and/or to the recording medium 23a via the external I/F 23. Examples of the recording medium 23a include various optical discs and various memory cards.

The RAM 24 is a volatile semiconductor memory that temporarily holds a program and data. The ROM 25 is a non-volatile semiconductor memory capable of holding a program and data even if power is turned off. The ROM 25 stores, for example, various types of information on the payment server device 20, such as OS settings and network settings, and a program for startup.

The CPU 26 is an arithmetic operation device that reads the program or data onto the RAM 24 from the ROM 25, the storage device 27, or the like and performs a process to control the overall operation of the payment server device 20 and implement the functions of the payment server device 20.

The storage device 27 is a storage unit such as an HDD, an SSD, or a flash ROM. The storage device 27 stores, for example, an OS that is a piece of basic software for controlling the overall operation of the payment server device 20, and application software (for example, the payment management program 200) for providing various functions to the OS, when the application server is executed by the CPU 26.

The communication I/F 28 is an interface for connecting the payment server device 20 to the network N. The payment server device 20 can perform data communication with the information terminal 10, the payment terminal 30, and the like via the communication I/F 28.

Figure 5:
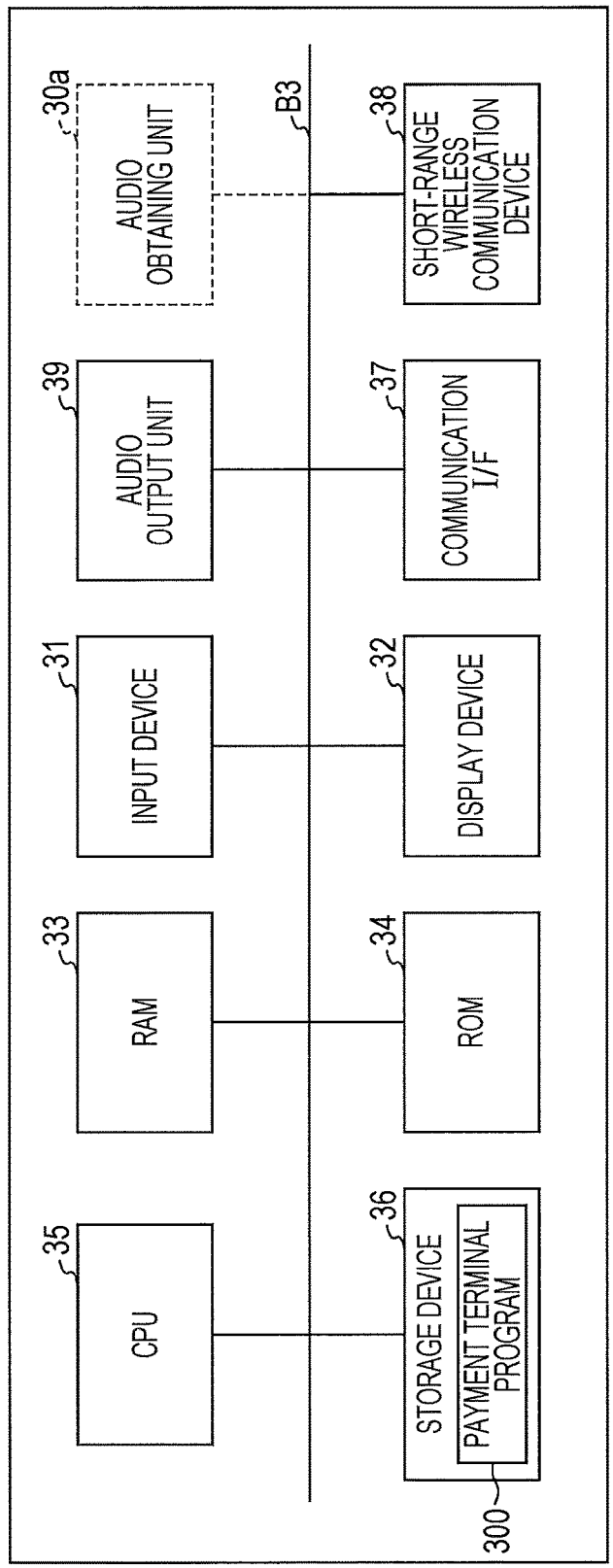
FIG. 5 is a hardware configuration diagram of an example of a payment terminal according to an example embodiment.

FIG. 5 is a hardware configuration diagram of an example of the payment terminal 30 according to an example embodiment.

Referring to FIG. 5, the payment terminal 30 may include, for example, an input device 31, a display device 32, a RAM 33, a ROM 34, a CPU 35, a storage device 36, a communication I/F 37, a short-range wireless communication device 38, and an audio output unit 39. The payment terminal 30 may further include an audio obtaining unit 30a. The hardware components described above are connected to one another via a bus B3.

The input device 31 is a touch panel, buttons, a keyboard, or the like, and is used by a user to input operation signals. The display device 32 is a display or the like, and displays the result of a process performed by the payment terminal 30.

The RAM 33 is a volatile semiconductor memory that temporarily holds a program and data. The ROM 34 is a non-volatile semiconductor memory capable of holding a program and data even if power is turned off. The ROM 34 stores, for example, various types of information on the payment terminal 30, such as OS settings and network settings, and a program for startup.

The CPU 35 is an arithmetic operation device that reads the program or data onto the RAM 33 from the ROM 34, the storage device 36, or the like and performs a process to control the overall operation of the payment terminal 30 and implement the functions of the payment terminal 30.

The storage device 36 is a storage unit such as an HDD, an SSD, or a flash ROM. The storage device 36 stores, for example, an OS that is a piece of basic software for controlling the overall operation of the payment terminal 30, and application software (for example, the payment terminal program 300) for providing various functions to the OS, when the application software is executed by the CPU 35.

The communication I/F 37 is an interface for connecting the payment terminal 30 to the network N. The payment terminal 30 can perform data communication with the payment server device 20 and the like via the communication I/F 37.

The short-range wireless communication device 38 communicates with the wearable terminal 40 or the like via a first short-range wireless communication method such as near-field communication (NFC), a sound wave, or an ultrasonic wave.

The audio output unit 39 is a device that outputs audio based on audio data, and includes a speaker, for example.

The audio obtaining unit 30a is a device that obtains audio, converts the obtained audio into a desired (or, alternatively, a predetermined) audio signal, audio data, or the like, and outputs the resulting signal or the like. The audio obtaining unit 30a may include a microphone, for example.

Figure 6:
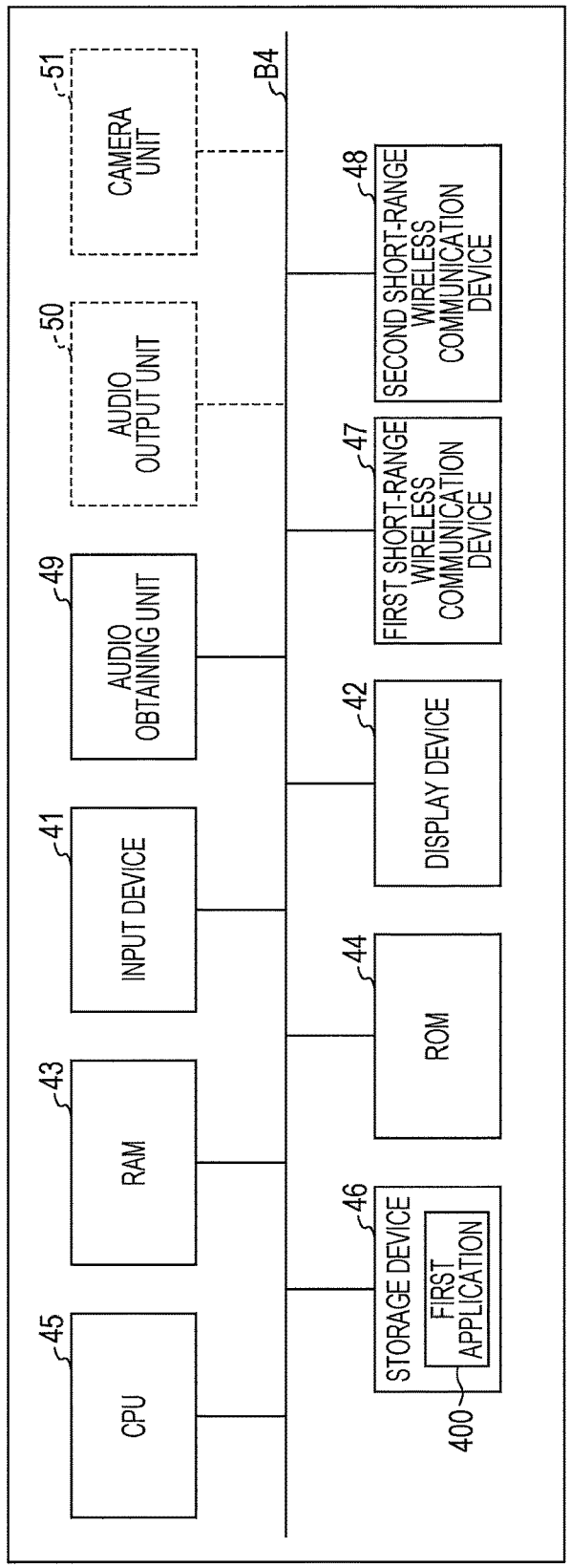
FIG. 6 is a hardware configuration diagram of an example of a wearable terminal according to an example embodiment.

FIG. 6 is a hardware configuration diagram of an example of the wearable terminal 40 according to an example embodiment.

Referring to FIG. 6, the wearable terminal 40 may include, for example, an input device 41, a display device 42, a RAM 43, a ROM 44, a CPU 45, a storage device 46, a first short-range wireless communication device 47, a second short-range wireless communication device 48, and an audio obtaining unit 49. The wearable terminal 40 may further include, for example, an audio output unit 50 and a camera unit 51. The hardware components described above are connected to one another via a bus B4.

The input device 41 is an input unit used by a user to input operation signals, and accepts, for example, operation instructions made by an operation unit such as a touch panel, buttons, a keyboard, or a dial or via audio obtained by the audio obtaining unit 49, described below, or the like. The display device 42 is a display or the like, and displays the result of a process performed by the wearable terminal 40, for example.

The RAM 43 is a volatile semiconductor memory that stores a program and data. The ROM 44 is a non-volatile semiconductor memory capable of holding a program and data even if power is turned off. The ROM 44 stores, for example, various types of setting information on the wearable terminal 40 and a program.

The CPU 45 is an arithmetic operation device that reads the program or data onto the RAM 43 from the ROM 44, the storage device 46, or the like and performs a process to control the overall operation of the wearable terminal 40 and implement the functions of the wearable terminal 40. When the first application 400 is executed by the CPU 45, the CPU 45 may be transformed into a special purpose computer configured to use a plurality of short-range wireless communication protocols to relay information between the payment terminal 30 and the payment server device 20. For example, the first application 400, when executed by the CPU 45, may configure the wearable terminal 40 to communicate with the information terminal 10 via a second short-range wireless communication protocol such that the wearable terminal 40 can instruct the information terminal 10 to relay information received, via the first short-range wireless communication protocol, from the payment terminal 30 to the payment server 20 over the network N. Therefore, the wearable terminal 40 may improve the functioning of the payment system 1 itself by acting an intermediately between the information terminal 10 and the payment terminal 30 supporting different communication protocols. Further, the wearable terminal 40 may confirm a payment transaction without interacting with the information terminal 10, thus, increasing the productivity of the user.

The storage device 46 is a storage unit such as a flash ROM. The storage device 46 stores, for example, an OS that is a piece of basic software for controlling the overall operation of the wearable terminal 40, and application software (for example, the first application 400) for providing various functions to the OS, when the application software is executed by the CPU 45.

The second short-range wireless communication device 48 includes, for example, a BLE chip or the like, and communicates with the information terminal 10 or the like via a second short-range wireless communication method such as BLE.

The first short-range wireless communication device 47 communicates with the payment terminal 30 or the like via a first short-range wireless communication method different from the second short-range wireless communication method, such as near field communication (NFC), a sound wave, or an ultrasonic wave.

The audio obtaining unit 49 is a device that obtains audio, converts the obtained audio into a desired (or, alternatively, a predetermined) audio signal, audio data, or the like, and outputs the resulting signal or the like. The audio obtaining unit 49 includes a microphone, for example.

The audio output unit 50 is a device that outputs audio based on audio data, and includes a speaker, for example.

The camera unit 51 captures an image of the surroundings and outputs the captured image as desired (or, alternatively, predetermined) image data.

The information terminal 10, the payment server device 20, the payment terminal 30, and the wearable terminal 40 according to an example embodiment implement various processes described below with the hardware configurations described above.

Functional Configuration

The functional configuration of the payment system 1 according to an example embodiment will now be described.

Figure 7:
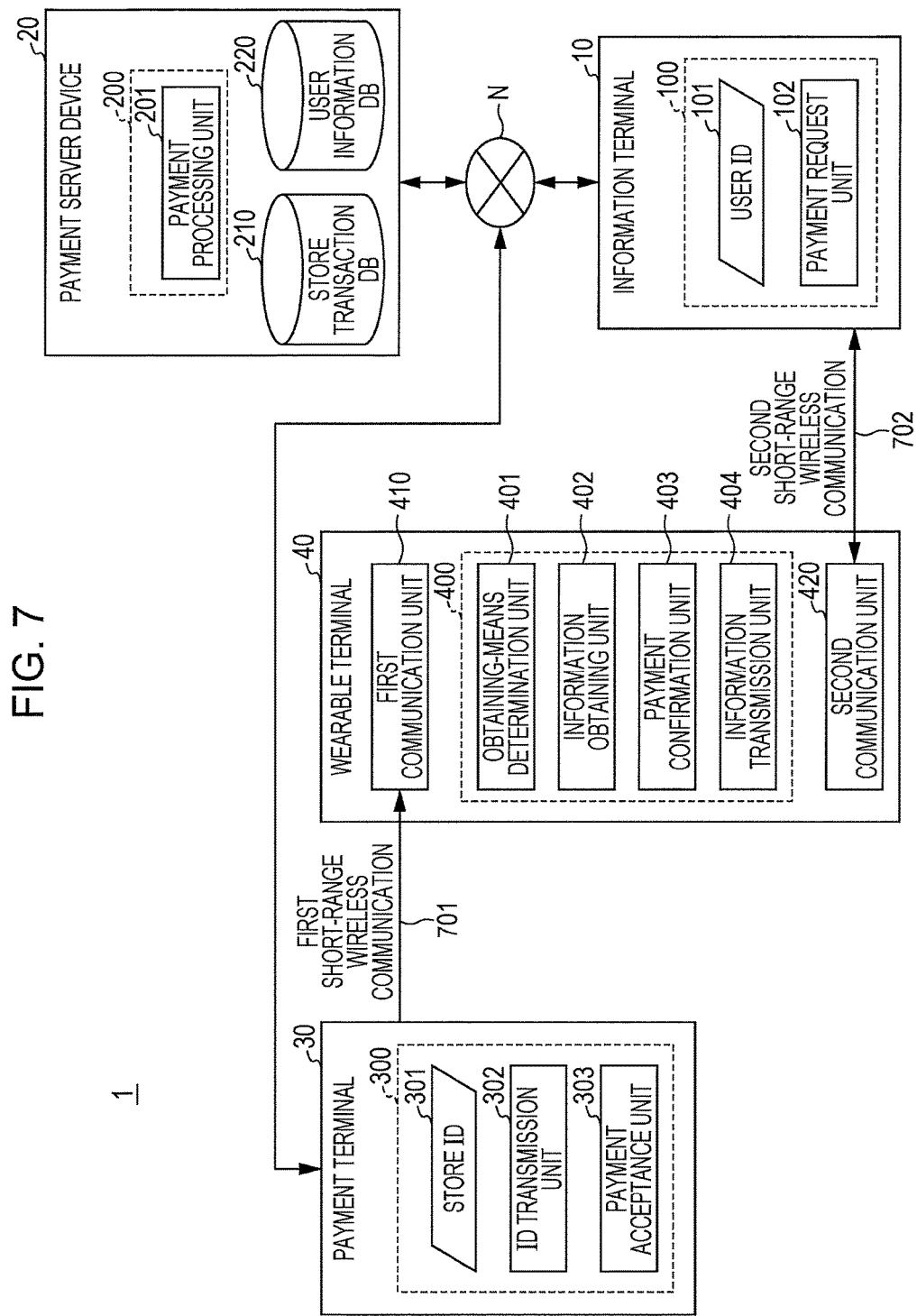
FIG. 7 is a functional block diagram of an example of the payment system according to an example embodiment.

FIG. 7 is a functional block diagram of an example of the payment system 1 according to an example embodiment.

Payment Terminal

The payment terminal program 300 of the payment terminal 30, when executed by the CPU 35, may configure the CPU 35 as, for example, an ID transmission unit 302, and a payment acceptance unit 303.

The storage device 36 may store a store ID 301 that is identification information used in the payment system 1 to uniquely identify a store (or shop).

The ID transmission unit 302 transmits, for example, a signal including the store ID 301 via a first short-range wireless communication method 701. This allows the wearable terminal 40 located near the payment terminal 30 to be notified that payment via the first short-range wireless communication method 701 is available.

A process performed by the ID transmission unit 302 is an example, and the payment terminal program 300 may not necessarily configure the CPU 35 as the ID transmission unit 302.

The payment acceptance unit 303 accepts input of monetary amount information by the staff at the store or some other suitable person. The monetary amount information indicates, for example, a monetary amount for goods or a service. Further, the payment acceptance unit 303 transmits payment information including the accepted monetary amount information and the store ID 301 using the first short-range wireless communication method 701.

The payment acceptance unit 303 may transmit, together with the payment information, a text string indicating an overview of the payment (for example, the store name, the payment amount, etc.). This enables the wearable terminal 40 to display the overview of the payment without, for example, decoding the payment information.

Wearable Terminal

The wearable terminal 40 includes a first communication unit 410 that performs communication via the first short-range wireless communication method 701, a second communication unit 420 that performs communication via a second short-range wireless communication method 702 different from the first short-range wireless communication method 701, and the first application 400. The first communication unit 410 and the second communication unit 420 may each include an antenna, a wired/wireless transceiver, and the like.

The first application 400 is an application for implementing a payment process in conjunction with the second application 100 in the information terminal 10 via the second short-range wireless communication method 702.

The first application 400, when executed by the CPU 45 of the wearable terminal 40, may configure the CPU 45 as, for example, an obtaining-means determination unit 401, an information obtaining unit 402, a payment confirmation unit 403, and an information transmission unit 404.

The obtaining-means determination unit 401 determines a transmission protocol (first short-range wireless communication method) for obtaining payment information from the payment terminal 30. The obtaining-means determination unit 401 may display, via the display device 42, the determined transmission protocol to the user.

For example, the wearable terminal 40 is configured to support as the first short-range wireless communication one or more transmission protocols, namely, BLE, NFC, and a sound wave. Further, the first application 400 in the wearable terminal 40, when executed by the CPU 45, configures the CPU 45 to perform a payment process in conjunction with the second application 100 in the information terminal 10 via the second short-range wireless communication method 702 based on BLE.

In the case that BLE is used as the second short-range wireless communication for communication with the second application 100. It may be desirable that the obtaining-means determination unit 401 determines a short-range wireless communication method based on NFC or a sound wave, which is different from that based on BLE, to be a first short-range wireless transmission protocol for obtaining the payment information from the payment terminal 30.

If short-range wireless communication methods based on NFC and a sound wave are available as possible first short-range wireless communication means for communication between the wearable terminal 40 and the payment terminal 30, in some cases, it may be bothersome to bring the wearable terminal 40 close to a reading unit of the payment terminal 30 at a certain distance (for example, within 10 cm). In such cases, the obtaining-means determination unit 401 may determine the short-range wireless communication method based on a sound wave to be a first short-range wireless transmission protocol for obtaining the payment information from the payment terminal 30.

In another example, there may be limitations on the short-range wireless communication methods available to the first application 400 due to the restriction of, for example, the OS, the wearable terminal 40, and the like. In this case, the obtaining-means determination unit 401 may determine a short-range wireless communication method available to the first application 400 to be a first short-range wireless transmission protocol for obtaining the payment information from the payment terminal 30.

The process performed by the obtaining-means determination unit 401 described above is an example. The first application 400 may not necessarily include the obtaining-means determination unit 401. In the case where the first application 400 does not include the obtaining-means determination unit 401, it may be sufficient that the CPU 45 determines in advance that, for example, the first short-range wireless communication method 701 indicates short-range wireless communication based on a sound wave and the second short-range wireless communication method 702 indicates short-range wireless communication based on BLE.

The information obtaining unit 402 obtains the payment information, the text string, and so forth from the signal obtained by the first communication unit 410. For example, if the first short-range wireless communication method 701 indicates short-range wireless communication based on a sound wave, the information obtaining unit 402 extracts the payment information, the text string, and so forth included in the sound wave obtained by the first communication unit 410.

The payment confirmation unit 403 causes a payment confirmation screen to be displayed on the display device 42 to prompt the user to perform a confirmation operation as to whether or not to make a payment.

When the payment confirmation unit 403 accepts input of information indicating that the user will make a payment, the information transmission unit 404 transmits the payment information obtained by the information obtaining unit 402 to the information terminal 10 using the second short-range wireless communication method 702 through the second communication unit 420.

The obtaining-means determination unit 401, the information obtaining unit 402, the payment confirmation unit 403, and the information transmission unit 404 are implemented by, for example, the CPU 45 illustrated in FIG. 6 executing the first application 400.

The first communication unit 410 is a transceiver that communicates with the payment terminal 30 using the first short-range wireless communication method 701, and is implemented by, for example, the first short-range wireless communication device 47 illustrated in FIG. 6 and a program executed by the CPU 45 illustrated in FIG. 6.

In this embodiment, the wearable terminal 40 is assumed to be capable of short-range wireless communication via a sound wave. In this case, the first communication unit 410 is implemented by, for example, the first short-range wireless communication device 47 and the audio obtaining unit 49 illustrated in FIG. 6 and a program executed by the CPU 45 illustrated in FIG. 6. In the case of two-way short-range wireless communication via a sound wave, the first communication unit 410 further includes, for example, the audio output unit 50 illustrated in FIG. 6.

In this embodiment, the method for transferring data via a sound wave is not limited to any specific method. For example, information may be transmitted by a sound wave with a desired (or, alternatively, a predetermined) frequency by using any available digital modulation technique such as frequency shift keying (FSK) or phase shift keying (PSK). Examples of the predetermined frequency include a frequency in the range of frequencies equal to or higher than 17 kHz within a frequency band (for example, from 20 Hz to 22 kHz) which can be obtained by the audio obtaining unit 49. Such a range of frequencies is not substantially audible for ordinary people, and is thus suitable for use in the transmission of the payment information.

The term "sound wave", as used in this embodiment, is used to include a sound wave with a frequency within the human audible range (for example, 20 Hz to 20 kHz), and an ultrasonic wave with a frequency beyond the human audible range (for example, higher than 20 kHz).

The first short-range wireless communication method 701 supported by the first communication unit 410 is described here in the context of a sound wave or NFC, by way of example. Short-range wireless communication methods based on a sound wave and NFC are merely examples. The first short-range wireless communication method 701 may be based on Bluetooth (registered trademark), BLE, Radio Frequency Identification (RFID), Infrared Data Association (IrDA), ZigBee (registered trademark), or the like.

The second communication unit 420 is a module that communicates with the information terminal 10 via the second short-range wireless communication method 702, and is implemented by, for example, the second short-range wireless communication device 48 illustrated in FIG. 6 and a program executed by the CPU 45 illustrated in FIG. 6.

The second short-range wireless communication method 702 by which the second communication unit 420 performs communication is described here in the context of BLE, by way of example. A short-range wireless communication method based on BLE is merely an example. The second short-range wireless communication method 702 may be based on Bluetooth, RFID, IrDA, ZigBee, or the like.

Information Terminal

The second application 100 in the information terminal 10 includes, for example, a user ID 101 and a payment request unit 102.

The user ID 101 is information stored in, for example, the storage device 17 or the like and used in the payment system 1 to uniquely identify a user, a user account, the information terminal 10, or the like.

Upon receipt of payment information from the first application 400 in the wearable terminal 40 via the second short-range wireless communication method 702, the payment request unit 102 transmits a payment request including the received payment information and the user ID 101 to the payment server device 20. The payment request unit 102 is implemented by, for example, the CPU 16 illustrated in FIG. 3 executing the second application 100.

Payment Server Device

The payment management program 200 in the payment server device 20 includes a payment processing unit 201. The payment server device 20 includes a store transaction database (DB) 210 and a user information DB 220.

The payment processing unit 201 is implemented by, for example, the CPU 26 illustrated in FIG. 4 or the like executing the payment management program 200, and is configured to update the store transaction DB 210 and the user information DB 220 and perform a payment process.

The store transaction DB 210 is implemented by, for example, the storage device 27 or a storage device connected to the payment server device 20 via the network N, and stores a store transaction table 210D. The store transaction table 210D will be described in detail below.

The user information DB 220 is implemented by, for example, the storage device 27 or a storage device connected to the payment server device 20 via the network N, and stores a user information table 220D. The user information table 220D will be described in detail below.

FIG. 8 is a configuration diagram of an example of the store transaction table 210D. The store transaction table 210D stored in the store transaction DB 210 has a data configuration illustrated in, for example, FIG. 8.

The store transaction table 210D contains transaction information for individual store IDs, and each piece of transaction information has data items such as a transaction ID, a transaction date, a payment amount, and a user ID. The transaction ID is information that uniquely identifies the transaction information. The transaction date is the date on which the transaction for goods and the like was made. The payment amount is a monetary amount (or an amount of money transacted) for the goods and the like involved in the transaction. The user ID is a user ID of a user who made the payment. As described above, the store transaction table 210D has recorded therein, for each store, information concerning a transaction for which payment has been made using the information terminal 10. For example, the transaction information with the transaction ID "TR001" in the store with the store ID "S001" indicates that "9,000 yen" was paid by the user with the user ID "U001" on the transaction date "12/01/2014".

Figure 9:
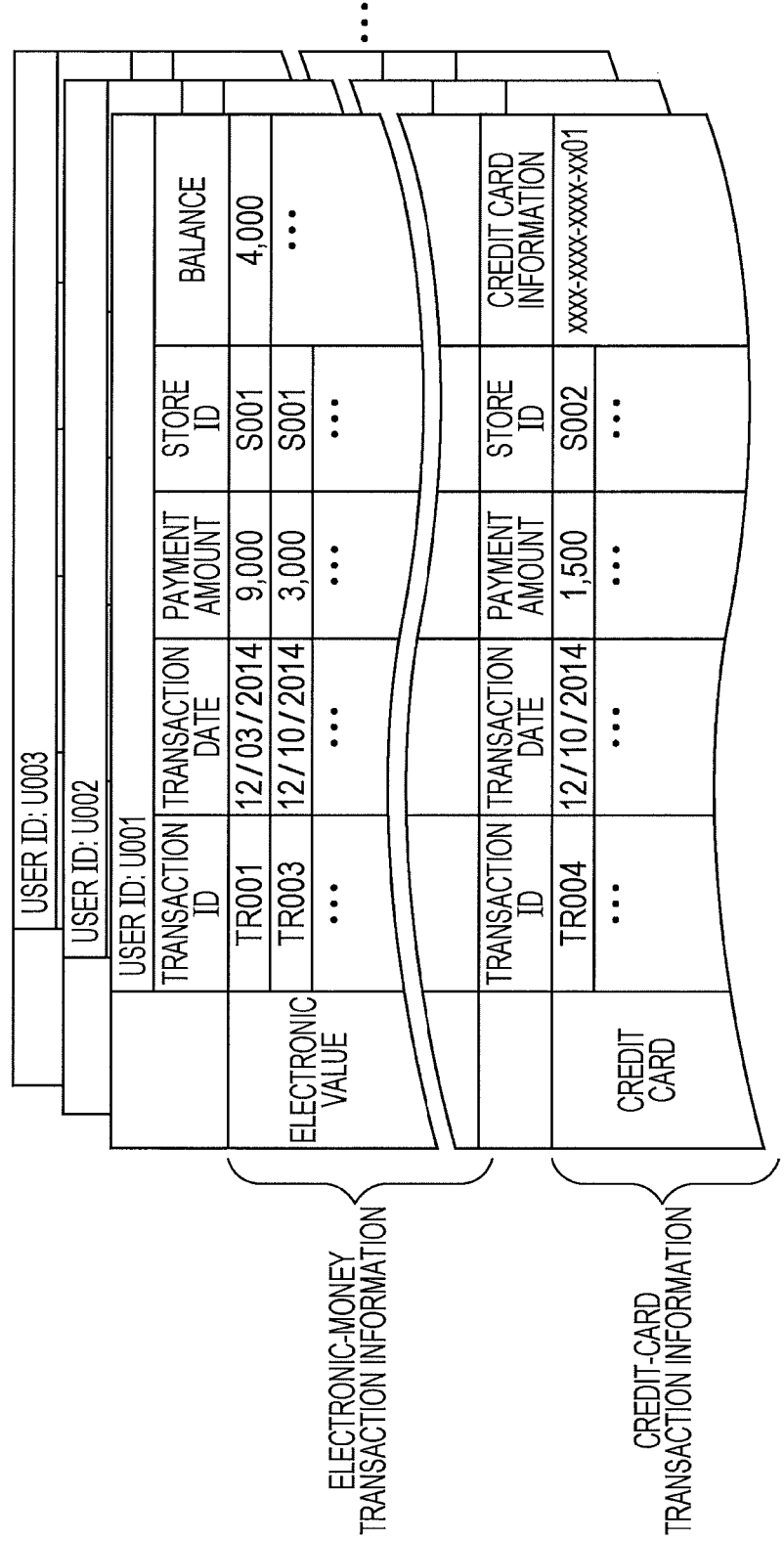
FIG. 9 is a configuration diagram of an example of a user information table.

FIG. 9 is a configuration diagram of an example of a user information table. The user information table 220D stored in the user information DB 220 has a data configuration illustrated in, for example, FIG. 9.

The user information table 220D contains transaction information for individual user IDs, and electronic value balance information or credit card information. The term "electronic value", as used herein, refers to information on a monetary amount for electronic money. The electronic value can be decreased in response to, for example, the purchase of goods and can be increased in response to, for example, the deposit of electronic money. The credit card information represents, for example, the number of a credit card which a user uses for payment.

Each piece of transaction information has data items such as a transaction ID, a transaction date, a payment amount, and a store ID. The transaction ID, the transaction date, and the payment amount are as described above. The store ID is a store ID of a store in which a transaction was made. For example, electronic-money transaction information illustrated in FIG. 9 indicates that, as a result of the payment of transactions with the transaction IDs "TR001", "TR003", . . . which were made by the user with the user ID "U001", the balance of the electronic value for the user with the user ID "U001" is "4,000 yen". In FIG. 9, transaction information for the payment made by the user on electronic money and transaction information for the payment made by the user on the credit card are recorded in the same table. The two types of transaction information may be recorded in different tables.

Details of Process

The details of the process performed in the payment system 1 according to some example embodiments will now be described, however, example embodiments are not limited thereto. In the following description, a user purchases goods in a store or the like and makes a payment using electronic money via the wearable terminal 40 and the information terminal 10.

In the following description, the short-range wireless communication method based on a sound wave described above is used as the first short-range wireless communication method for communication between the payment terminal 30 and the wearable terminal 40, by way of example, however, example embodiments are not limited thereto. Further, in the following description, the second short-range wireless communication method for communication between the wearable terminal 40 and the information terminal 10 is based on BLE, however, example embodiments are not limited thereto. The short-range wireless communication methods described above are merely examples, and are not intended to limit the scope of the example embodiments. For example, each of the first and second short-range wireless communication methods may be a short-range wireless communication method such as NFC, IrDA, or RFID.

Figure 10:
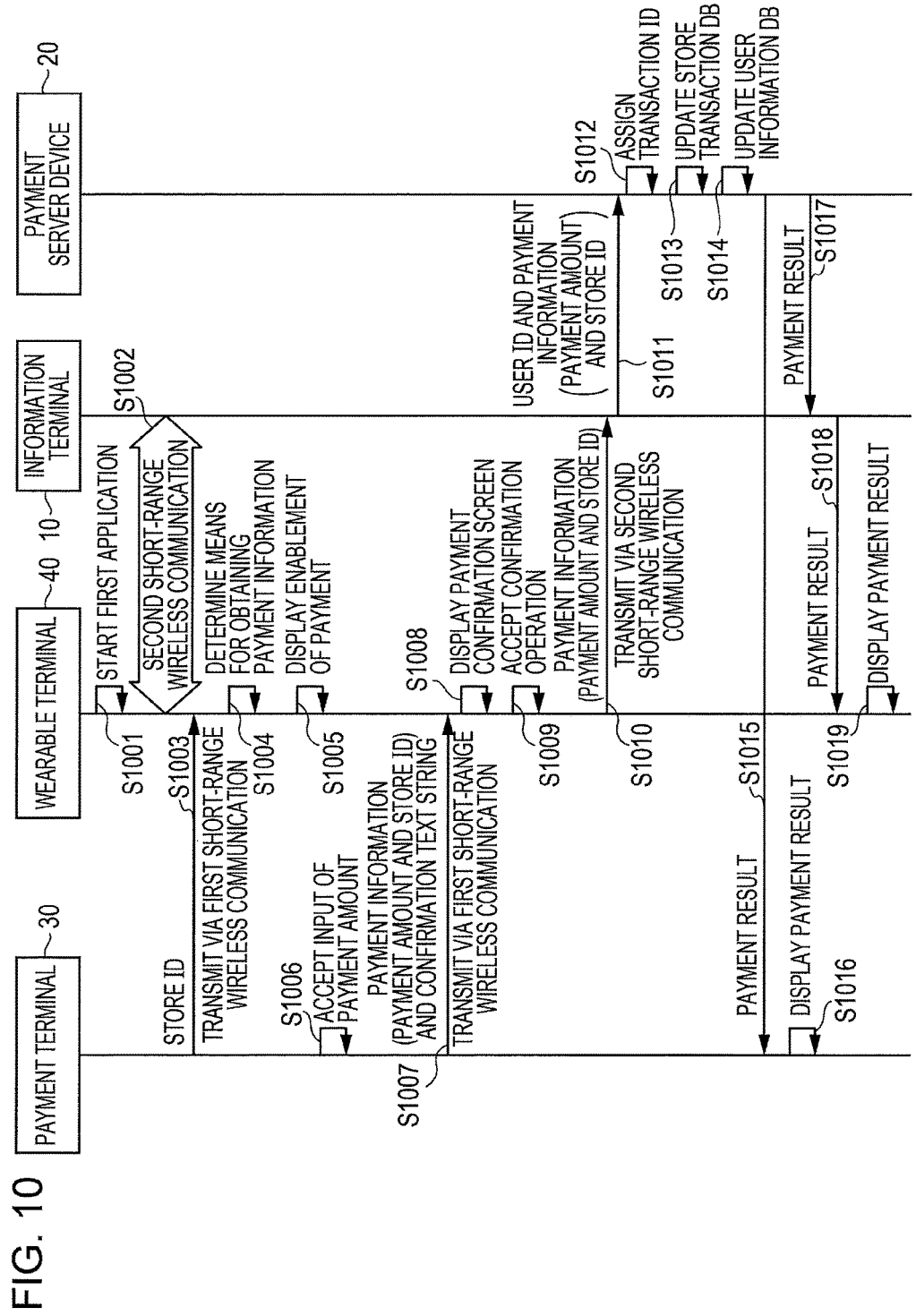
FIG. 10 is a sequence diagram illustrating an example of a payment process flow according to the first embodiment.

FIG. 10 is a sequence diagram illustrating an example of a payment process flow according to an example embodiment.

In operation S1001, for example, a user starts the first application 400 in the wearable terminal 40.

Then, in operation S1002, the started first application 400 may configure the CPU 45 to communicate with the second application 100 in the information terminal 10 via BLE (i.e., the second short-range wireless communication method 702).

In operation S1003, the payment terminal 30 may transmit the store ID 301 to the wearable terminal 40 via short-range wireless communication based on a sound wave (i.e., the first short-range wireless communication method 701).

In operation S1004, upon detection of a designated sound wave (for example, a sound wave including the store ID 301), the obtaining-means determination unit 401 of the wearable terminal 40 determines a first short-range wireless communication method based on the sound wave to be a transmission protocol for obtaining payment information.

Figure 11A:
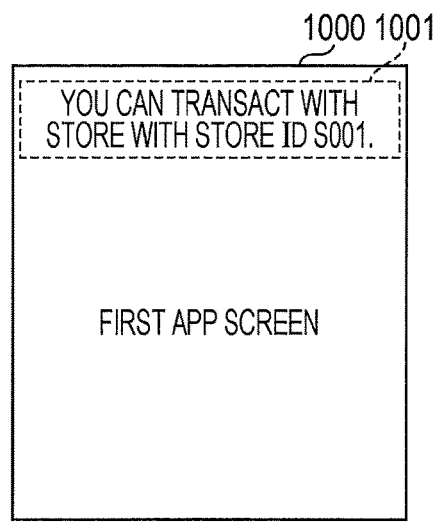
FIGS. 11A to 11D illustrate example images of screens displayed on the wearable terminal.

In operation S1005, the obtaining-means determination unit 401 causes information indicating the enablement of payment, such as that illustrated in FIG. 11A, to be displayed on the display device 42 illustrated in FIG. 6. In the example illustrated in FIG. 11A, a message 1001 indicating that a transaction with the store with the store ID "S001" is available is displayed on the screen at a predetermined position (for example, in an upper portion of the screen).

Figure 12A:
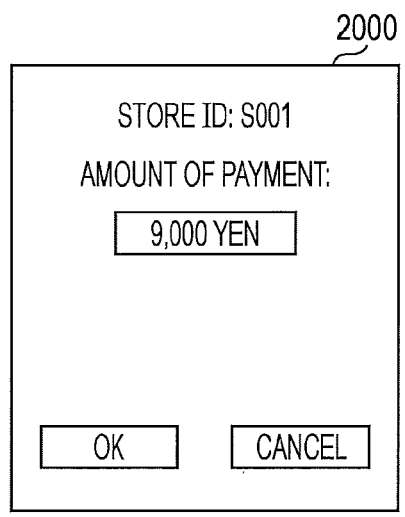
FIGS. 12A and 12B illustrate example images of screens displayed on the payment terminal.

In operation S1006, the payment terminal 30 receives an input, for example from a staff at the store or some other suitable person, of a monetary amount (a payment amount) for goods and the like that the user wishes to purchase (here, "9,000") using the input device 31 or the like of the payment terminal 30. For example, as illustrated in FIG. 12A, the staff at the store or some other suitable person inputs a payment amount on a payment amount input screen 2000, and presses an OK button. Accordingly, the payment acceptance unit 303 of the payment terminal 30 accepts input of the payment amount.

In operation S1007, the payment acceptance unit 303 transmits payment information from the payment terminal 30 to the wearable terminal 40 via short-range wireless communication based on a sound wave (i.e., the first short-range wireless communication method 701). The transmitted payment information may include the input payment amount and the store ID 301.

In some example embodiments the payment acceptance unit 303 may transmit, together with the payment information, a text string indicating an overview of the details of the payment via short-range wireless communication based on a sound wave (i.e., the first short-range wireless communication method 701).

In operation S1008, upon receipt of the payment information (and the text string) via short-range wireless communication based on the sound wave (i.e., the first short-range wireless communication method 701), the information obtaining unit 402 of the wearable terminal 40 extracts the payment information (and the text string) included in the sound wave. Further, the payment confirmation unit 403 of the wearable terminal 40 causes a payment confirmation screen to be displayed on, for example, the display device 42 illustrated in FIG. 6.

Figure 11B:
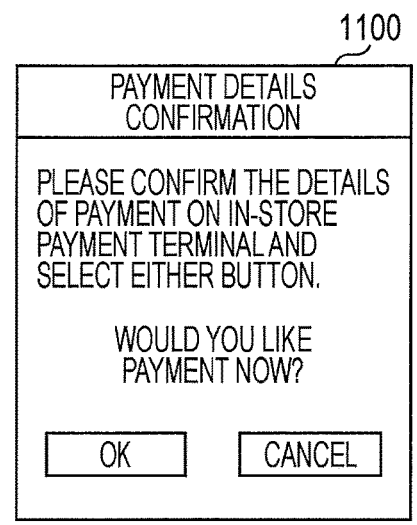
Figure 11C:
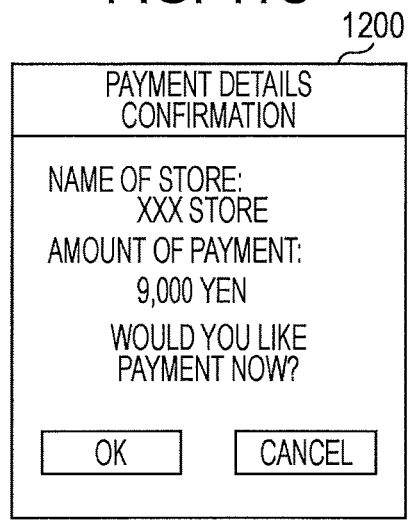

FIGS. 11B and 11C illustrate examples of the payment confirmation screen displayed on the display device 42.

Referring to FIG. 11B, a confirmation screen 1100 may be displayed in a case where the payment terminal 30 has not transmitted a text string indicating an overview of the details of the payment, together with the payment information. The confirmation screen 1100 shows a message that prompts the user to select whether or not to make a payment after confirming the details of the payment on the payment terminal 30, and also shows buttons used to select whether or not to make a payment.

Referring to FIG. 11C, a confirmation screen 1200 may be displayed in a case where the payment terminal 30 has transmitted a text string indicating an overview of the details of the payment, together with the payment information. The confirmation screen 1200 shows information indicating an overview of the payment, such as the store name and the monetary amount, and also shows buttons used to select whether or not to make a payment. The displayed images illustrated in FIGS. 11B and 11C are merely examples.

Referring back to FIG. 10, the process illustrated in the sequence diagram will further be described.

In operation S1009, the payment confirmation unit 403 of the wearable terminal 40 accepts input by the user as to whether or not to make a payment through the payment confirmation screen. The following description will be given of a case where information indicating that a payment will be made (for example, the selection of the "OK" button on the confirmation screen 1100) has been accepted. Upon acceptance of information indicating that no payment will be made (for example, the selection of the "NO" button on the confirmation screen 1100), for example, the payment confirmation unit 403 terminates the process.

In operation S1010, the information transmission unit 404 of the wearable terminal 40 transmits the payment information obtained by the information obtaining unit 402 from the wearable terminal 40 to the information terminal 10 via BLE (i.e., the second short-range wireless communication method 702).

In operation S1011, the payment request unit 102 of the information terminal 10 transmits a payment request including the payment information received from the wearable terminal 40 and the user ID 101 of the information terminal 10 (here, "U001") to the payment server device 20 via the network N.

In operations S1012 to S1014, upon receipt of the payment request from the information terminal 10, the payment processing unit 201 of the payment server device 20 performs a payment process.

For example, in operation S1012, the payment processing unit 201 may obtain the payment amount and the store ID, and assigns a transaction ID for uniquely identifying a transaction associated with the payment amount and the store ID.

Further, in operation S1013, the payment processing unit 201 may update the store transaction table 210D and the user information table 220D. That is, the payment processing unit 201 adds transaction information to the store transaction table 210D on the basis of the information included in the received payment request, namely, the user ID 101, the store ID 301, and the payment amount, and on the basis of the transaction ID assigned in step S1013. Specifically, after obtaining a transaction date, that is, the date "12/03/2014" on which the payment was made, the payment processing unit 201 adds transaction information of the transaction ID "TR001", the transaction date "12/03/2014", the payment amount "9,000", and the user ID "U001" to the store transaction table 210D for the store ID "S001".

Also, the payment processing unit 201 adds electronic-money transaction information to the user information table 220D on the basis of the store ID, the payment amount, and the transaction ID. Further, the payment processing unit 201 decreases, on the basis of the user ID, the balance of the electronic value for the user with the user ID by an amount equal to the payment amount. Specifically, the payment processing unit 201 adds electronic-money transaction information associated with the transaction ID "TR001", the transaction date "12/03/2014", the payment amount "9,000", and the store ID "S001" to the user information table 220D for the user ID "U001", and then decreases the balance by "9,000". The payment process in operations S1012 to S1014 are merely examples.

After the completion of the series of payment processing operations in operations S1012 to S1014, then in operation S1015, the payment processing unit 201 of the payment server device 20 notifies the payment terminal 30 of the payment result via the network N.

Figure 12B:

In operation S1016, upon receipt of the payment result from the payment server device 20, the payment terminal 30 causes, for example, a payment result display screen 2100 illustrated in FIG. 12B to be displayed on the display device 32. This allows the staff at the store or some other suitable person to recognize that the transaction for the goods and the like has been successfully completed.

In operation S1017, the payment processing unit 201 of the payment server device 20 also notifies the information terminal 10 of the payment result via the network N.

In operation S1018, upon receipt of the payment result from the payment server device 20, the information terminal 10 transfers the received payment result to the wearable terminal 40.

Figure 11D:
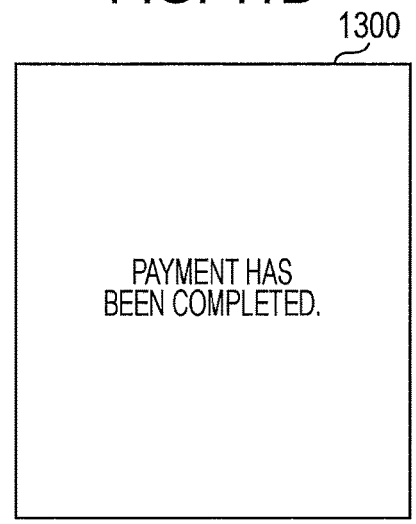

In operation S1019, upon receipt of the payment result from the information terminal 10, the wearable terminal 40 causes, for example, a payment result display screen 1300 illustrated in FIG. 11D to be displayed on the display device 42. This allows the user of the wearable terminal 40 to recognize that the payment for the purchased goods and the like has been successfully completed.

In the payment system 1 according to some example embodiments, as described above, a series of processes until a user makes a payment after the user has purchased goods and the like in a store or the like is completed. A remittance to the store's bank or financial account is made on a regularly basis such as monthly or weekly in accordance with the store transaction DB 210 updated in operation S1013.

In the foregoing description, a user makes a payment on electronic money, by way of example. A similar process is performed for payment on a credit card. In the case of payment on a credit card, it may be sufficient to update the user information table 220D in the processing of operation S1014 described above so that transaction information for payment on a credit card is added to the user information table 220D.

An example of a process in a case where the wearable terminal 40 fails to detect a sound wave including the store ID 301, which is transmitted from the payment terminal 30, in operation S1004 in FIG. 10 will be described.

Figure 13:
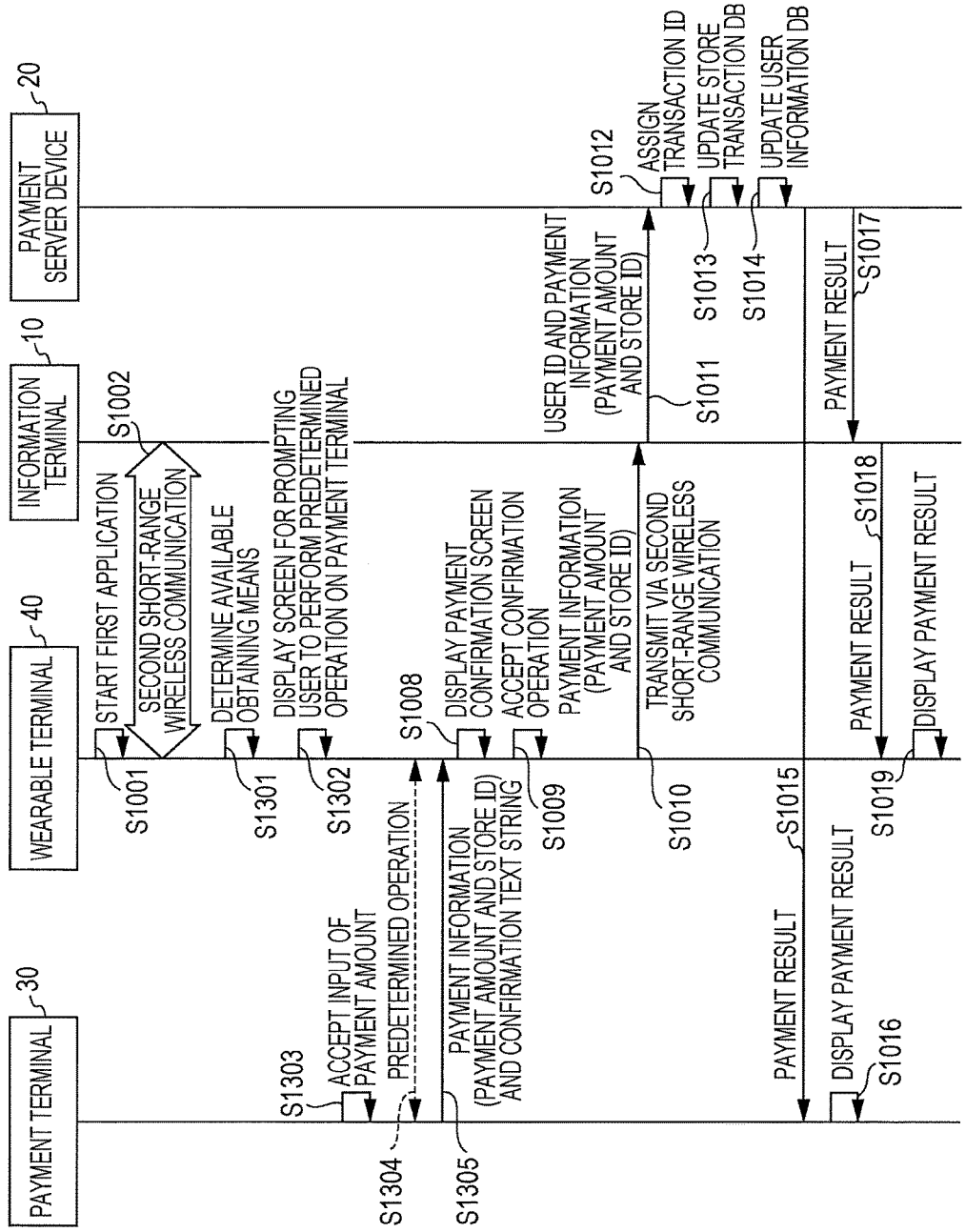
FIG. 13 is a sequence diagram illustrating another example of the payment process flow according to the first embodiment.

FIG. 13 is a sequence diagram illustrating another example of the payment process flow according to an example embodiment. In FIG. 13, the processes of operations S1001, S1002, and S1008 to S1019 are similar to those illustrated in FIG. 10, and differences will be mainly described.

Referring to FIG. 13, in operation S1301, in a case where a sound wave including desired (or, alternatively, predetermined) information transmitted from the payment terminal 30 is not detectable, the obtaining-means determination unit 401 of the wearable terminal 40 determines communication protocols available to the first application 400 (i.e., the first short-range wireless communication method 701).

For example, it is assumed that the wearable terminal 40 is configured to support short-range wireless communication based on BLE, NFC, and a sound wave, and BLE is used as a second short-range wireless communication method for communication between the first application 400 and the second application 100.

In this case, the obtaining-means determination unit 401 may determine a short-range wireless communication method (NFC or a sound wave) different from BLE to be a first short-range wireless communication method by which payment information is obtained from the payment terminal 30.

As described above, the wearable terminal 40 according to this embodiment can obtain payment information from the payment terminal 30 via any of a plurality of first short-range wireless communication methods different from a second short-range wireless communication method. Accordingly, for example, if NFC is not available due to the restriction of the OS or the like, the wearable terminal 40 can obtain payment information from the payment terminal 30 via short-range wireless communication based on a sound wave.

Figure 14A:
FIGS. 14A and 14B illustrate other example images of screens displayed on the wearable terminal.
Figure 14B:

In step S1302, the obtaining-means determination unit 401 causes a display screen indicating that payment is available, such as any of display screens illustrated in FIGS. 14A and 14B, to be displayed on the display device 42.

In the example illustrated in FIG. 14A, a message 3001 indicating that payment via a sound wave is available and showing information that prompts a user to perform a positioning operation (for example, approaching the payment terminal 30) is displayed on a display screen 3000 at a desired (or, alternatively, a predetermined) position (for example, in an upper portion) of the display screen 3000.

In the example illustrated in FIG. 14B, a message 3101 indicating that payment via NFC is available and showing information that prompts a user to perform the positioning operation (for example, bringing the information terminal 10 close to a reader of the payment terminal 30) is displayed on a display screen 3100 at the position (for example, in an upper portion) of the display screen 3100.

The display screens illustrated in FIGS. 14A and 14B are examples, and a message which indicates that payment is available via a plurality of means (for example, a sound wave and NFC) and which prompts a user to perform a plurality of predetermined operations may be displayed on a display screen.

In operation S1303, the payment terminal 30 may receive an input, for example, from the staff at the store or some other suitable person, of a monetary amount (a payment amount) for goods and the like that the user wishes to purchase by using the input device 31 or the like of the payment terminal 30. Accordingly, the payment acceptance unit 303 of the payment terminal 30 accepts input of the payment amount. The staff at the store or the like further prompts the user to perform the positioning operation (such as approaching the payment terminal 30 or bringing the wearable terminal 40 close to an NFC reading unit of the payment terminal 30).

In operation S1304, when the user performs the positioning operation, payment information, a text string for confirmation, and so forth are transmitted from the payment terminal 30 to the wearable terminal 40 via a first short-range wireless communication method such as a sound wave or NFC.

As described above, the processes after operation S1008 are similar to those in FIG. 10, and are not described herein.

While the foregoing description has been given of the case where a sound wave or NFC is used as a means by which the wearable terminal 40 obtains payment information, the means for obtaining payment information may be a short-range wireless communication means such as IrDA or RFID. In a case where the wearable terminal 40 includes the camera unit 51, the wearable terminal 40 may be configured to capture an image of a two-dimensional code or the like to obtain payment information.

Figure 15:
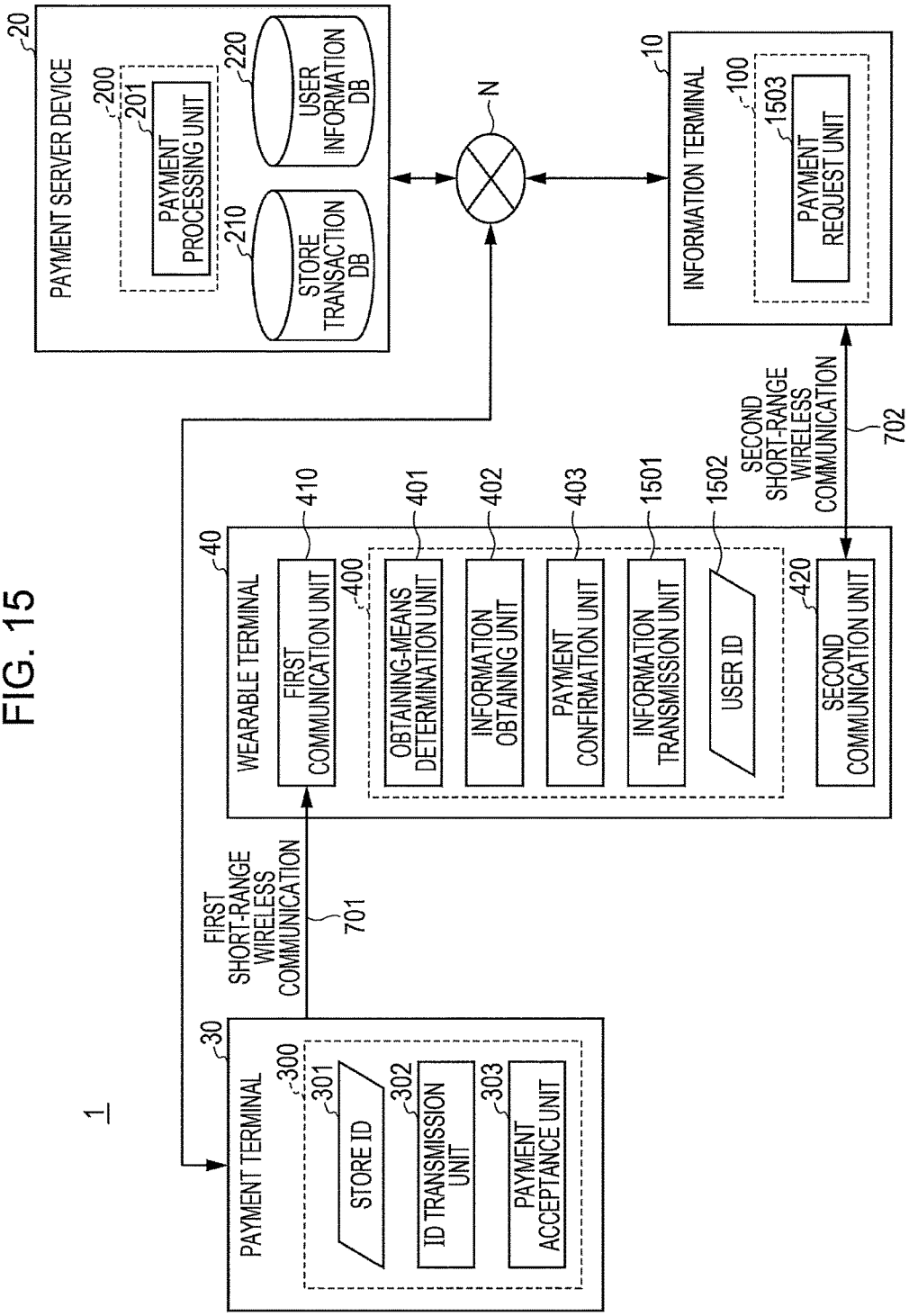
FIG. 15 is a functional block diagram of an example of a payment system according to an example embodiment.

FIG. 15 is a functional block diagram of an example of a payment system 1 according to another example embodiment.

Referring to FIG. 15, while FIG. 7 illustrates an example in which the information terminal 10 has the user ID 101. Alternatively, as illustrated in FIG. 15, in other example embodiments, the wearable terminal 40 may have a user ID.

As in the first embodiment, a wearable terminal 40 according to an example embodiment includes a first communication unit 410, a second communication unit 420, and the CPU 45 configured using a first application 400.

Further, in some example embodiments, the storage device 46 included in the wearable terminal 40 may include a user ID 1502 in addition to storing the elements of the first application 400.

The user ID 1502 is information stored in, for example, the storage device 46 or the like and used in the payment system 1 to uniquely identify a user, a user account, the wearable terminal 40, or the like.

Further, an information transmission unit 1501 of the first application 400 according to this embodiment transmits the user ID 1502, together with the payment information to be transmitted to the information terminal 10, via a second short-range wireless communication method 702.

The other elements of the wearable terminal 40 may be similar to those of the wearable terminal 40 according to the example embodiment illustrated in FIG. 7, and, therefore detailed description will be omitted for the sake of brevity.

As in the first embodiment, the information terminal 10 according to this embodiment includes the CPU 16 configured to execute a second application 100.

In some example embodiments, the information terminal 10 may not necessarily have the user ID 101, which is included in the information terminal 10 according to the first embodiment illustrated in FIG. 7.

The configuration of the payment system 1, other than the configuration described above, is similar to that of the payment system 1 according to the first embodiment illustrated in the block diagram in FIG. 7, and is not described herein.

Figure 16:
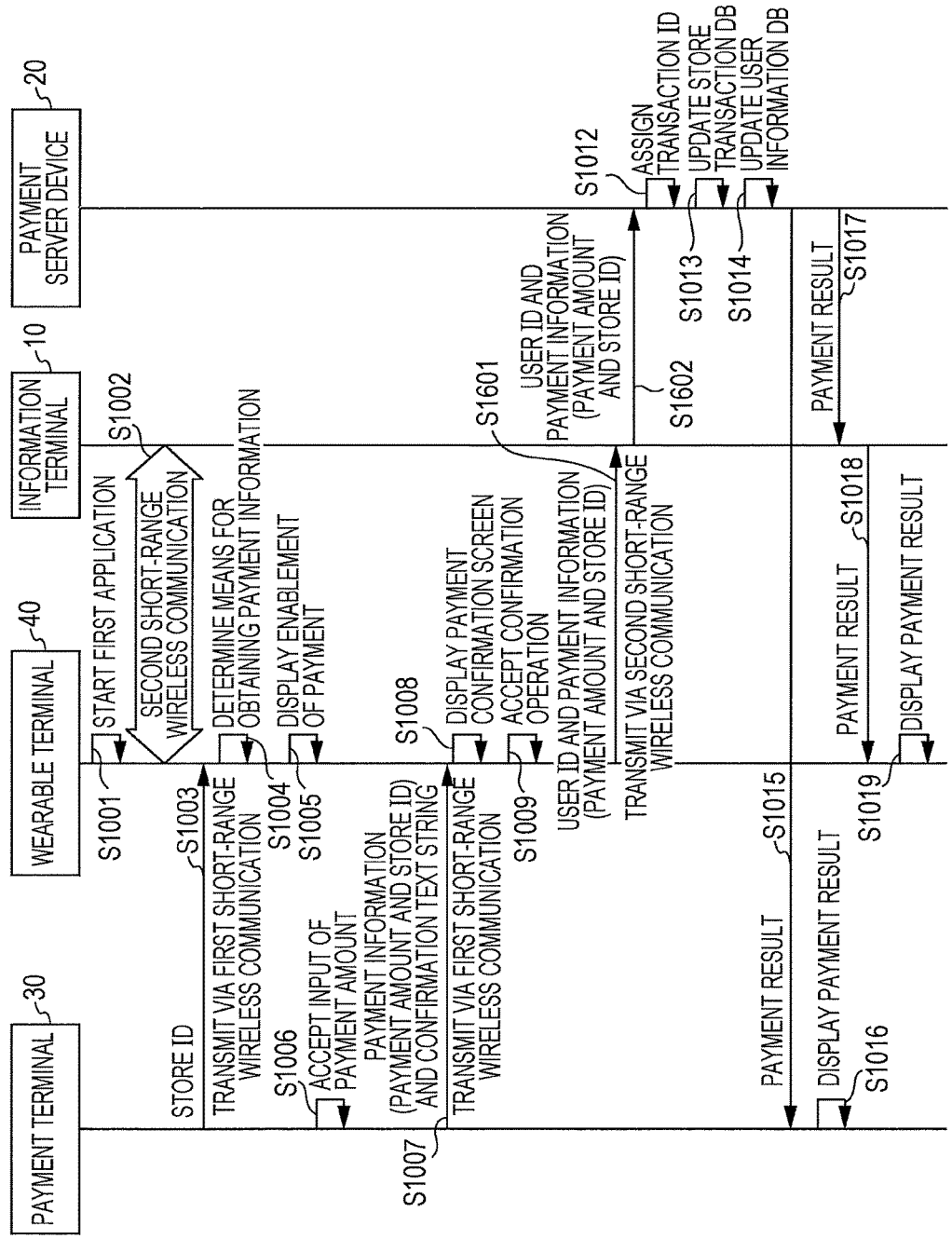
FIG. 16 is a sequence diagram illustrating an example of a payment process flow according to an example embodiment.

FIG. 16 is a sequence diagram illustrating an example of a payment process flow according to an example embodiment.

Referring to FIG. 16, the processes of operations S1001 to S1009 and S1012 to S1019 are similar to those in the example embodiment illustrated in FIG. 10, and differences will be mainly described hereinafter.

In operation S1009, the payment confirmation unit 403 of the wearable terminal 40 accepts information indicating that the user will makes a payment (for example, the selection of the "OK" button on the confirmation screen 1100).

In operation S1601 in FIG. 16, the information transmission unit 1501 of the wearable terminal 40 transmits the user ID 1502, together with the payment information obtained by the information obtaining unit 402, to the information terminal 10 via BLE (i.e., the second short-range wireless communication method 702).

In operation S1602, a payment request unit 1503 of the information terminal 10 transmits a payment request including the payment information received from the wearable terminal 40 and the user ID 1502 to the payment server device 20 via the network N.

The processes after operation S1012 in FIG. 16 may be similar to those in the first embodiment illustrated in FIG. 10.

In the payment system 1 according to an example embodiment, the payment server device 20 can be requested to perform payment activities by using the user ID 1502 stored in the wearable terminal 40 instead of using the user ID 101 stored in the information terminal 10.

Figure 17:
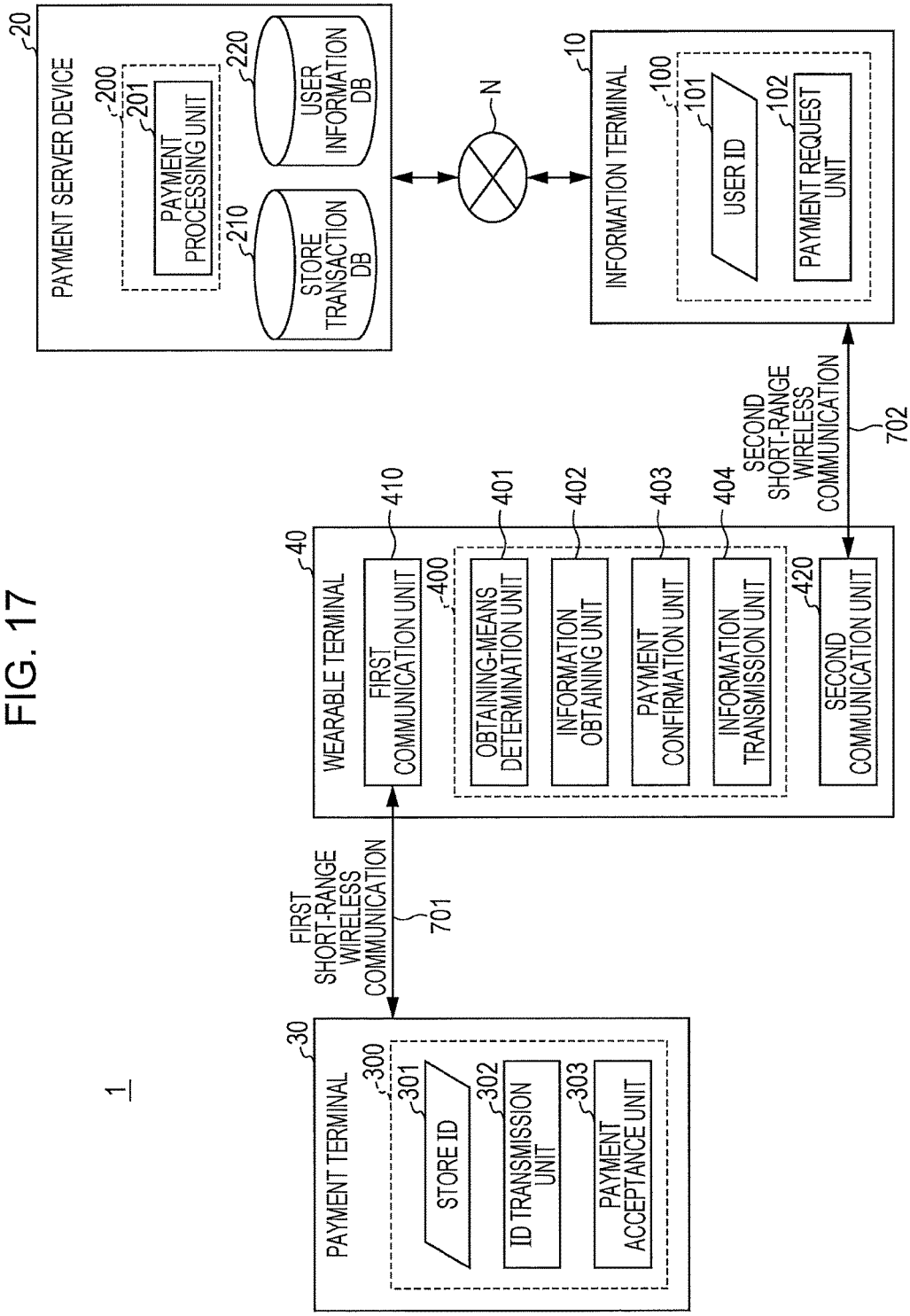
FIG. 17 is a functional block diagram of an example of a payment system according to an example embodiment.

FIG. 17 is a functional block diagram of an example of a payment system 1 according to some example embodiments.

Referring to FIG. 17, in the payment system 1 according to this embodiment illustrated in FIG. 17, the payment terminal 30 is not connected to the network N. For example, the payment terminal 30 may be an information device not connected to the network N, such as an offline POS terminal, a tablet terminal, or a smartphone. Further, the first short-range wireless communication method 701 for communication between the payment terminal 30 and the wearable terminal 40 provides two-way communication between the payment terminal 30 and the wearable terminal 40.

For example, the first short-range wireless communication method 701 indicates short-range wireless communication based on a sound wave. In this case, the first communication unit 410 of the wearable terminal 40 is assumed to be capable of transmitting information to the payment terminal 30 by using, for example, the audio output unit 50 illustrated in FIG. 6.

Also, in a case where the first short-range wireless communication method 701 indicates short-range wireless communication based on a sound wave, the payment terminal 30 is assumed to be capable of receiving a sound wave transmitted from the wearable terminal 40 and obtaining information included in the received sound wave by using, for example, the audio obtaining unit 30a illustrated in FIG. 5.

The other configuration is similar to the configuration illustrated in FIG. 7, and, therefore, repeated description will be omitted for the sake of brevity.

Figure 18:
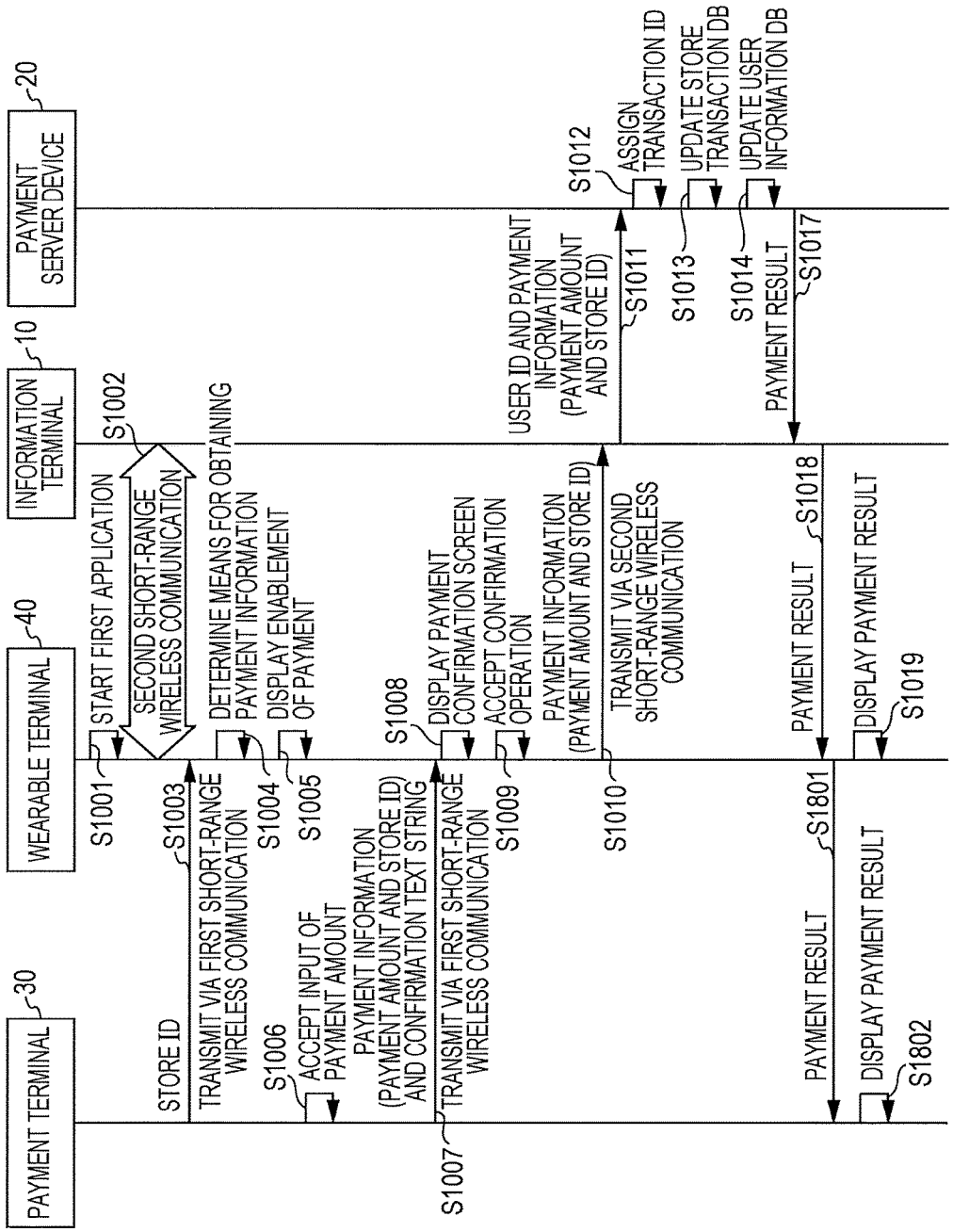
FIG. 18 is a sequence diagram illustrating an example of a payment process flow according to an example embodiment.

FIG. 18 is a sequence diagram illustrating an example of a payment process flow according to the third embodiment.

Referring to FIG. 18, the processes of operations S1001 to S1014 are similar to those illustrated in the example embodiments illustrated in FIG. 10, and differences will be mainly described.

In FIG. 18, when the series of payment processes in operation S1012 to S1014 is completed, then in operation S1017, the payment server device 20 notifies the information terminal 10 of the payment result. When the payment terminal 30 is not connected to the network N, the payment server device 20 may not also transmit the payment result directly to the payment terminal 30 via the network N.

In operation S1018, upon receipt of the payment result from the payment server device 20, the information terminal 10 transfers the received payment result to the wearable terminal 40.

In operation S1019, upon receipt of the payment result from the information terminal 10, the wearable terminal 40 causes the payment result display screen 1300 illustrated in, for example, FIG. 11D to be displayed on the display device 42. This allows the user of the wearable terminal 40 to recognize that payment for the purchased goods and the like has been successfully completed.

In addition, in operation S1801, the wearable terminal 40 notifies the payment terminal 30 of the payment result via the first short-range wireless communication method 701. Therefore, the payment terminal 30 may receive the payment result indirectly from the wearable terminal 40 rather than directly from the payment server device 20.

In operation S1802, upon receipt of the payment result from the wearable terminal 40, the payment terminal 30 causes, for example, the payment result display screen 2100 illustrated in FIG. 12B to be displayed on the display device 32. This allows the staff at the store or some other suitable person to recognize that the transaction for the goods and the like has been successfully completed.

Accordingly some example embodiments are implementable even in a case where the payment terminal 30 which is an information device not connected to the network N, such as an offline POS terminal, a tablet terminal, or a smartphone.

In summary, a terminal device (40) according to an example embodiment includes a first communication unit (410) that performs communication via a first short-range wireless communication method (701), and a second communication unit (420) that performs communication via a second short-range wireless communication method (702) different from the first short-range wireless communication method (410). The terminal device (40) further includes a CPU 45 configured as: an obtaining unit (402) that obtains payment information including information on a monetary amount for goods or a service by using the first communication unit (410), a confirmation unit (403) that accepts input of information indicating payment approval for the obtained payment information, and a transmission unit (404) that, in response to acceptance of input of the information indicating the payment approval, transmits the obtained payment information to an information terminal (10) by using the second communication unit (420), the information terminal being configured to communicate with a payment server (20) via a network (N), the payment server (20) being configured to perform a payment process related to the obtained payment information.

Accordingly, it may be possible to provide a terminal device (40) capable of making payment using a plurality of short-range wireless communication methods in a payment system (1) in which payments are made using the terminal device (40) in conjunction with an information terminal (10).

It should be noted that the reference numerals in parentheses are added for ease of understanding and are illustrative only, and are not intended to limit the scope of the example embodiments.

It should be understood that the example embodiments are not limited to the specific embodiments disclosed herein, and a variety of modifications and changes can be made without departing from the appended claims.

What is claimed is:

1. A terminal device comprising:
   a first transceiver configured to communicate via a first short-range wireless communication protocol;
   a second transceiver configured to communicate via a second short-range wireless communication protocol, the second short-rage wireless communication protocol being different from the first short-range wireless communication protocol; and
   a processor configured to,
      obtain, via the first transceiver, payment information including information on a monetary amount for goods or services from a payment terminal; and
      accept input of information indicating payment approval for the obtained payment information; and
      transmit, via the second transceiver, the obtained payment information to an information terminal, in response to the payment approval, the information terminal being configured to communicate with a payment server via a network, the payment server being configured to perform a payment process related to the obtained payment information, the information terminal and the payment terminal being different terminals.

2. The terminal device according to claim 1, wherein the first transceiver is configured to communicate via the first short-range wireless communication protocol using a sound wave or an ultrasonic wave.

3. The terminal device according to claim 2, wherein the first transceiver is configured to receive the sound wave or the ultrasonic wave.

4. The terminal device according to claim 1, wherein the first transceiver is configured to communicate via the first short-range wireless communication protocol based on a Radio Frequency Identification (RFID).

5. The terminal device according to claim 1, wherein the first transceiver is configured to communicate via the first short-range wireless communication protocol based on Bluetooth Low Energy.

6. The terminal device according to claim 1, wherein the second transceiver is configured to communicate via the second short-range wireless communication protocol based on Bluetooth Low Energy.

7. The terminal device according to claim 1, wherein the terminal device is a user-wearable terminal.

8. A payment system comprising:
   the terminal device according to claim 1; and
   the payment terminal, the payment terminal configured to transmit, via the first short-range wireless communication protocol, the payment information and a text string to the terminal device, the text string related to content of the payment.

9. A non-transitory computer readable medium, storing program code that, when executed by a processor, configures the processor to perform a method, the method comprising:
   obtaining, via a first transceiver using a first short-range wireless communication protocol, payment information including information on a monetary amount for goods or a service from a payment terminal;
   accepting input of information indicating payment approval for the obtained payment information; and
   transmitting, via a second transceiver using a second short-range wireless communication protocol, the obtained payment information to an information terminal, in response to the payment approval, the information terminal being configured to communicate with a payment server via a network, the payment server being configured to perform a payment process related to the obtained payment information, the payment terminal and the information terminal being different terminals.

10. A terminal device comprising:
at least one transceiver configured to collectively communicate via at least a first short-range wireless communication protocol and a second short-range wireless communication protocol; and
a memory and a processor, the memory storing computer readable code that, when executed by the processor, configures the processor to,
relay, via the at least the one transceiver, information received via the first short-range wireless communication protocol to a server via the second short-rage wireless communication protocol, and
process a result received from the server via the second short-range wireless communication protocol, wherein the processor is configured to relay the information by,
receiving, via the at least one transceiver, the information from a first terminal via the first short-range wireless communication protocol, the first terminal being a payment terminal, and
transmitting, the information to a second terminal via the second short-range wireless communication protocol, the first terminal and the second terminal being different terminals.

11. The terminal device of claim 10, wherein the processor is configured to instruct the second terminal to transmit the information to the server.

12. The terminal device of claim 11, wherein the first terminal is configured to communicate with the server via one or more of a cellular network and a Wi-Fi network.

13. The terminal device of claim 11, wherein
the information is payment information, and
the processor is configured to instruct the second terminal to transmit the payment information to the server along with identification information of a user associated with one or more of the terminal device and the second terminal.

14. The terminal device of claim 10, wherein the at least one transceiver comprises:
a first transceiver configured to communicate with the first terminal via the first short-range wireless communication protocol; and
a second transceiver configured to communicate with the second terminal via the second short-range wireless communication protocol.

15. The terminal device of claim 14, wherein
the first short-range wireless communication protocol is a protocol that utilizes a sound wave or ultrasonic wave to transmit data, and
the second short-range wireless communication protocol is a protocol that utilizes electromagnetic fields to transmit data.

16. The terminal device of claim 15, wherein the second short-range wireless communication protocol is an Radio Frequency Identification (RFID) protocol.

17. The terminal device of claim 15, wherein the second short-range wireless communication protocol is a Bluetooth Low Energy (BLE) protocol.

18. The terminal device of claim 10, wherein the terminal device is configured to relay the information without requiring a user to access the first terminal.

19. The terminal device of claim 18, wherein the terminal device is a wearable device.

* * * * *